(12) United States Patent
Morozov et al.

(10) Patent No.: US 11,686,938 B2
(45) Date of Patent: Jun. 27, 2023

(54) AUGMENTED REALITY DEVICE FOR PROVIDING 3D AUGMENTED REALITY AND OPERATING METHOD OF THE SAME

(71) Applicant: SAMSUNG ELECTRONICS CO., LTD., Suwon-si (KR)

(72) Inventors: Aleksander Victorovich Morozov, Moscow (RU); Igor Vitalievich Yanusik, Moscow (RU); Anastasiia Andreevna Kalinina, Moscow (RU); Jinho Lee, Moscow (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/550,600

(22) Filed: Dec. 14, 2021

(65) Prior Publication Data

US 2022/0187601 A1 Jun. 16, 2022

(30) Foreign Application Priority Data

Dec. 16, 2020 (RU) .......................... RU2020141527
Jul. 9, 2021 (KR) ........................ 10-2021-0090286

(51) Int. Cl.
*G02B 27/01* (2006.01)
*H04N 13/32* (2018.01)
(Continued)

(52) U.S. Cl.
CPC ..... *G02B 27/0101* (2013.01); *G02B 27/0179* (2013.01); *G02B 30/27* (2020.01);
(Continued)

(58) Field of Classification Search
CPC ............ G02B 27/0101; G02B 27/0179; G02B 27/0081; G02B 27/0093; G02B 30/27;
(Continued)

(56) References Cited

U.S. PATENT DOCUMENTS 4,932,731 A 6/1990 Susuki et al.
5,210,626 A 5/1993 Kumayama et al.
(Continued)

FOREIGN PATENT DOCUMENTS

CN 104380157 A 2/2015
CN 102815267 B 9/2015
(Continued)

OTHER PUBLICATIONS

Martinez-Corral et al., "Fundamentals of 3D imaging and displays: a tutorial on integral imaging, light-field, and plenoptic systems," Advances in Optics and Photonics, vol. 10, No. 3, Jul. 3, 2018, pp. 512-566, XP55914148, DOI: 10.1364/AOP.10.000512.
(Continued)

*Primary Examiner* — Brent D Castiaux
(74) *Attorney, Agent, or Firm* — Sughrue Mion, PLLC

(57) ABSTRACT

An augmented reality device for providing three-dimensional (3D) augmented reality and an operation method of the same are provided. The augmented reality device includes a multi-view picture generation unit configured to generate a multi-view picture including single-view images having respective individual characteristics, and generate an exit pupil including the generated multi-view picture, a waveguide configured to replicate the exit pupil generated by the multi-view picture generation unit, and an eyebox viewing zone generation unit configured to separate the single-view images based on the individual characteristics, and generate a three-dimensional (3D) image by outputting the single-view images in viewing zones in an eyebox corresponding to views of the single-view images.

32 Claims, 29 Drawing Sheets

(51) Int. Cl.
  *G02B 30/30* (2020.01)
  *G02B 30/27* (2020.01)
  *G06F 3/01* (2006.01)
  *G09G 3/00* (2006.01)
  *B60K 35/00* (2006.01)
  *H04N 13/385* (2018.01)

(52) U.S. Cl.
  CPC ............. *G02B 30/30* (2020.01); *G06F 3/013* (2013.01); *G09G 3/003* (2013.01); *H04N 13/32* (2018.05); *H04N 13/385* (2018.05); *B60K 35/00* (2013.01); *B60K 2370/149* (2019.05); *B60K 2370/1529* (2019.05); *G02B 2027/0114* (2013.01); *G02B 2027/0123* (2013.01); *G02B 2027/0187* (2013.01)

(58) Field of Classification Search
  CPC ........ G02B 30/30; G02B 30/25; G02B 30/20; G02B 2027/0114; G02B 2027/0123; G02B 2027/0187; G02B 2027/0134; G06F 3/013; G06F 3/011; G09G 3/003; G09G 2380/10; H04N 13/32; H04N 13/385; H04N 13/351; B60K 35/00; B60K 2370/149; B60K 2370/1529; B60K 2370/334
  See application file for complete search history.

(56) References Cited

U.S. PATENT DOCUMENTS

| | | | |
|---|---|---|---|
| 8,593,734 B2 | 11/2013 | Laakkonen | |
| 8,786,683 B2 | 7/2014 | Akita | |
| 9,251,743 B2 | 2/2016 | Nestorovic | |
| 9,715,110 B1 | 7/2017 | Brown et al. | |
| 9,838,674 B2 | 12/2017 | Cho et al. | |
| 10,067,347 B2 | 9/2018 | Vallius et al. | |
| 10,444,518 B2 | 10/2019 | Ponomarev et al. | |
| 10,545,346 B2 | 1/2020 | Waldern et al. | |
| 10,613,320 B2 | 4/2020 | Masson et al. | |
| 2003/0095492 A1 | 5/2003 | Nishino et al. | |
| 2011/0032346 A1 | 2/2011 | Kleinberger | |
| 2015/0015685 A1 | 1/2015 | Muller | |
| 2017/0261748 A1 | 9/2017 | Powell | |
| 2018/0052276 A1 | 2/2018 | Klienman et al. | |
| 2018/0120559 A1* | 5/2018 | Yeoh | G02B 26/123 |
| 2018/0275402 A1* | 9/2018 | Popovich | G02B 6/0035 |
| 2020/0073120 A1* | 3/2020 | von Spiegel | G02B 27/0093 |

FOREIGN PATENT DOCUMENTS

| | | |
|---|---|---|
| EP | 0 420 195 A2 | 4/1991 |
| EP | 0 724 174 A1 | 7/1996 |
| JP | 1-296213 A | 11/1989 |
| JP | 10-319342 A | 4/1998 |
| WO | 2017/134412 A1 | 8/2017 |
| WO | 2019/238840 A1 | 12/2019 |
| WO | 2019/238854 A1 | 12/2019 |
| WO | 2019/238869 A1 | 12/2019 |

OTHER PUBLICATIONS

Iwane, "Light field display and 3D image reconstruction," Proceedings of SPIE, vol. 9867, pp. 98670S-1-98670S-12, Jun. 1, 2016, XP060069064, DOI: 10.1117/12.2227081.

Lippmann, "Epreuves Reversibles Donnat La Sensation Du Relief (Reversible Prints Providing the Sensation of Depth)", Journal De Physique Theorique Et Appliquee, vol. 7, Nov. 1, 1908, pp. 821-825, XP009029916.

Anonymous, "Head-up display," Wikipedia, last edited Nov. 26, 2020, XP55914163, Retrieved from the Internet: URL:https://web.archive.org/web/20201126221655/https://en.Wikipedia.org/wiki/Head-up_display [retrieved on Apr. 20, 2022], total 13 pages.

Communication dated May 2, 2022, issued by the European Patent Office in counterpart European Application No. 21214736.7.

European Search Report issued by the European Patent Office dated Sep. 8, 2022 in EP application No. 21214736.7.

* cited by examiner

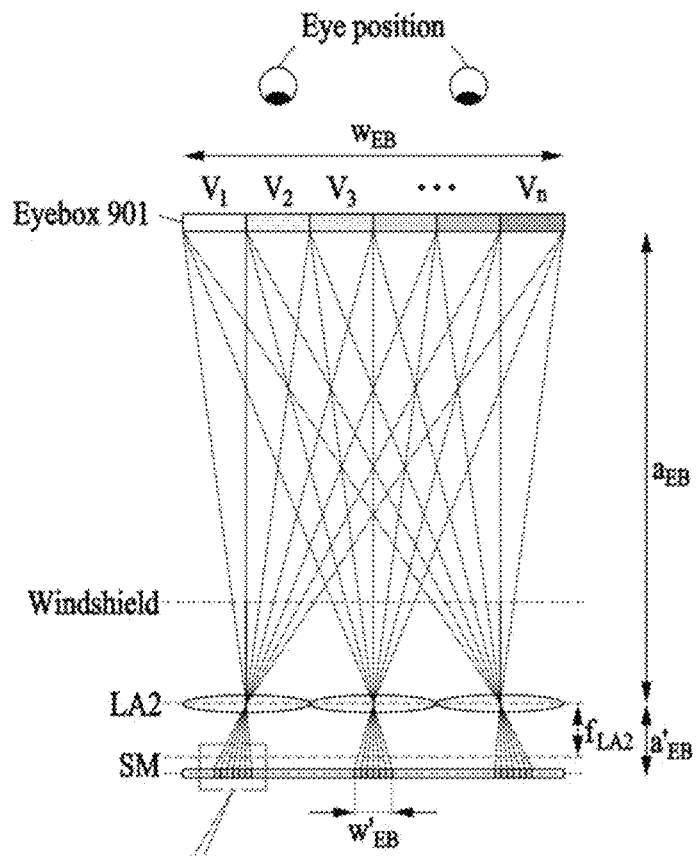
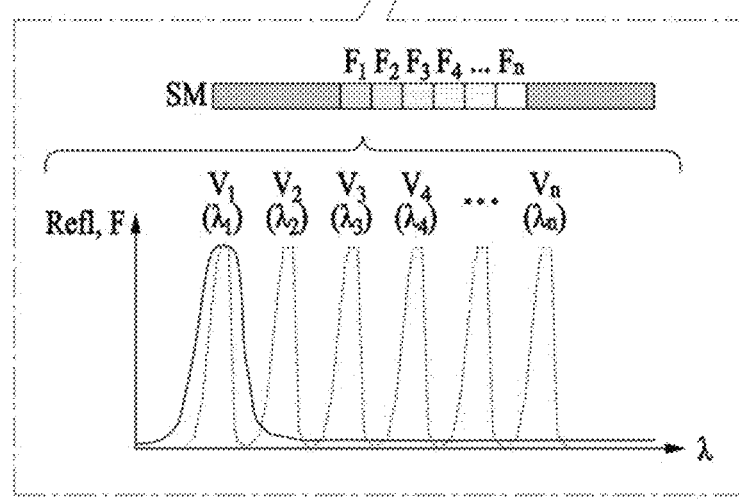
FIG. 9B
FIG. 9A

AUGMENTED REALITY DEVICE FOR PROVIDING 3D AUGMENTED REALITY AND OPERATING METHOD OF THE SAME

CROSS-REFERENCE TO RELATED APPLICATION

This application claims priority from Russian Patent Application No. 2020141527, filed on Dec. 16, 2020, in the Russian Federal Service for Intellectual Property, and Korean Patent Application No. 10-2021-0090286, filed on Jul. 9, 2021, in the Korean Intellectual Property Office, the disclosures of which are incorporated herein by reference in their entireties.

BACKGROUND

1. Field

Example embodiments relate to an augmented reality device for providing three-dimensional (3D) augmented reality and an operation method of the same.

2. Description of the Related Art

Augmented reality (AR) provides a new experience to a user by overlaying a virtual image on a real object. For example, AR may be applied to various AR devices such as AR glasses, which are eyewear-type AR devices, and AR head-up display (HUD) devices.

Currently, the use of HUD devices in the automotive industry becomes increasingly popular. A HUD device may generate a virtual image at a finite or infinite distance from a driver and provide a user with information on vehicle speed, engine status, phone calls, and the like through the virtual image. Providing such information through other external devices may distract the user. The user may concentrate on the road or surroundings through the HUD device while keeping eyes forward.

AR and three-dimensional (3D) images may be combined in the HUD device, thereby improving safety during driving. For example, navigation information such as lanes and route markings, and information on risk factors (e.g., constructions, traffic accidents, and pedestrians) may be displayed on the road or at the actual locations of the risk factors through AR and 3D HUD images, and the driver may intuitively recognize the information displayed at the actual locations.

SUMMARY

One or more example embodiments may address at least the above problems and/or disadvantages and other disadvantages not described above. Also, the example embodiments are not required to overcome the disadvantages described above, and an example embodiment may not overcome any of the problems described above.

According to an aspect of an example embodiment, there is provided an augmented reality device including a multi-view picture generation unit configured to generate a multi-view picture including single-view images having respective individual optical characteristics, and generate an exit pupil including the generated multi-view picture, a waveguide configured to replicate the exit pupil generated by the multi-view picture generation unit, and an eyebox viewing zone generation unit configured to separate the single-view images based on the individual characteristics, and generate a three-dimensional (3D) image by outputting the single-view images in viewing zones in an eyebox corresponding to views of the single-view images.

The single-view images may have a same field of view (FOV).

The multi-view picture generation unit may include at least one light source, a beam combiner, at least one image source, and projection optics.

The multi-view picture generation unit may include at least two light sources, each configured to emit light with one wavelength or with different wavelengths, and the at least two light sources may be configured to emit light simultaneously or in an alternating manner according to a control signal.

The augmented reality device of claim 3, wherein the beam combiner is configured to mix and combine light from different light sources and output the mixed light to the image source.

The beam combiner may be an optical element with a reflective coating that allows the light to be reflected or redirected in a predetermined direction.

The optical element may be a glass plate with a dichroic coating or with a coating having prismatic or diffraction patterns.

The beam combiner may be a waveguide-based combiner.

The waveguide may be configured to perform X-axial replication and Y-axial replication at different times or simultaneously, in replicating the exit pupil.

The waveguide may correspond to a flat substrate with an in-coupling element, an expander, and an out-coupling element embedded therein.

The in-coupling element may be configured to in-couple light into the waveguide with a first predetermined angle, the expander may be configured to replicate the exit pupil within the waveguide, and the out-coupling element may be configured to out-couple the light from the waveguide with a second predetermined angle.

The waveguide may be further configured to perform simultaneous exit pupil replication along X and Y axes, and the expander, the in-coupling element, and the out-coupling element may be combined in one optical element in a form of a diffraction element.

The multi-view picture generation unit may be further configured to generate RGB images, and the waveguide may include a combination of three waveguides, each of which translates an image of one color of the RGB images.

The multi-view picture generation unit may be further configured to generate RGB images, and the waveguide may include a combination of a first waveguide configure to translate an image of at least one color of the RGB image, and a second waveguide configured to an image of at least two colors of the RGB images.

The multi-view picture generation unit may be further configured to generate RGB images, and the waveguide may include a single waveguide configured to translation a combined image of the RGB images.

The eyebox viewing zone generation unit may include a stack of at least two optical arrays, and a spatial mask configured to perform light filtering based on the individual optical characteristics.

The spatial mask may perform the light filtering based on at least one of a wavelength and a polarization state of the individual characteristics in a passive operation mode.

The spatial mask may be configured to perform the light filtering by adjusting an image generation time of the individual characteristics in an active operation mode.

The stack of at least two optical arrays may be configured to provide a telescopic beam path to an input and an output of the stack.

Each of microlens arrays of the stack may include at least one lenticular lens, which is a cylindrical lens or a spherical lens.

The microlens arrays of the stack may include a first microlens array and a second microlens array, and a number of lenses in the first microlens array is equal to a number of lenses in the second microlens array.

A first array of the stack may be a micromirror array including at least one mirror, a second array of the stack may be at least one cylindrical or spherical lens array, and a number of mirrors in the first array may correspond to a number of lenses in the second array.

A first microlens array of the stack may be included in an out-coupling element of the waveguide, and may be configured to out-couple light and focus the light on the spatial mask.

In a passive operation mode, the spatial mask may be a layer of absorbing material with intermittent filter segments embedded therein, each of which transmits light of a predetermined wavelength which corresponds to a wavelength of light emitted from the at least one light source of the multi-view picture generation unit.

The filter segments may be dichroic filters.

In a passive operation mode, the spatial mask may be configured to transmit light based on a polarization state, which is one of S polarization, P polarization, right-hand circular polarization (RHCP), and left-hand circular polarization (LHCP).

In an active operation mode, the spatial mask may be configured to display an image with one spectral composition or polarization state in an alternating manner for a left eye and a right eye.

In an active operation mode, an operating frequency of the spatial mask may be synchronized to a frame change frequency of an image source of the multi-view picture generating unit.

The augmented reality device may include: a detector configured to sense an eye movement; and an actuator configured to shift the spatial mask in a passive operation mode.

The augmented reality device may include: a detector configured to sense an eye movement; and a controller configured to transmit an amount of image shift to the spatial mask in an active operation mode.

In the active operation mode, the spatial mask may be shifted based on the amount of image shift in real time according to the following equation, $P_d = M * \Delta x$, where $P_d$ is a dynamic pitch indicating the amount of shift, M is an magnification of a lens array of the stack, and $\Delta x$ is an amount of the eye movement from a reference position.

According to an aspect of another example embodiment, an image generation method may include: generating a multi-view picture including single-view images having respective individual optical characteristics; generating an exit pupil including the generated multi-view picture; replicating the exit pupil using a waveguide; separating the single-view images based on the individual optical characteristics; and generating a three-dimensional (3D) image by outputting the single-view images in viewing zones in an eyebox corresponding to views of the single-view images.

BRIEF DESCRIPTION OF THE DRAWINGS

The above and/or other aspects will be more apparent by describing certain example embodiments with reference to the accompanying drawings, in which:

FIGS. 9A and 9B illustrate a filtering operation of a spatial mask according to example embodiments.

DETAILED DESCRIPTION

Figure 1:
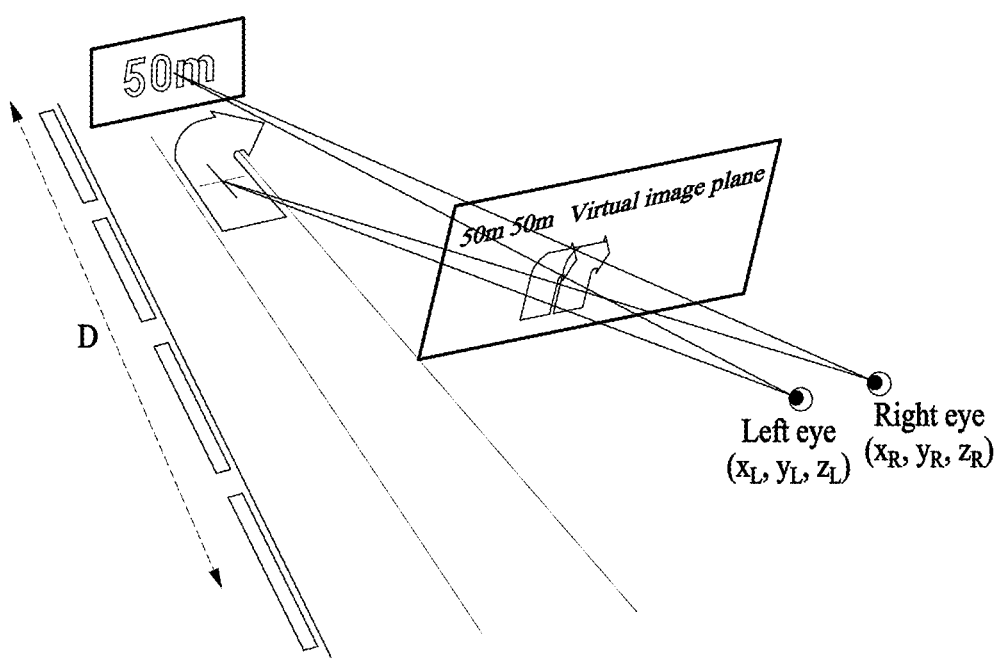
FIG. 1 illustrates a scheme of generating a three-dimensional (3D) image according to example embodiments.

The following detailed structural or functional description is provided as an example only and various alterations and modifications may be made to the examples. Here, the examples are not construed as limited to the disclosure and should be understood to include all changes, equivalents, and replacements within the idea and the technical scope of the disclosure.

Terms, such as first, second, and the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

It should be noted that if it is described that one component is "connected", "coupled", or "joined" to another component, a third component may be "connected", "coupled", and "joined" between the first and second components, although the first component may be directly connected, coupled, or joined to the second component.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, all of a, b, and c, or any variations of the aforementioned examples.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Hereinafter, example embodiments will be described in detail with reference to the accompanying drawings. When describing the example embodiments with reference to the accompanying drawings, like reference numerals refer to like components and a repeated description related thereto will be omitted.

The notions and terms used herein may be defined below.

The term "view" is a predetermined viewing angle of a multi-view picture and/or a single two-dimensional (2D) image corresponding to the predetermined viewing angle.

The term "viewing zone" is an area in an exit pupil plane where a predetermined view and/or each single-view image is viewed. The exit pupil plane may correspond to an eyebox. In example embodiments, viewing zones may be generated as a spatial mask image in an eyebox. The spatial mask image may be generated by a lens array. The number of light sources which generate views provided by an image generation unit, used in an augmented reality (AR) device, may define the number of the viewing zones.

The term "exit pupil" is a volume of space where a virtual image is observed.

The term "exit pupil replication" is an increase in the size of an exit pupil. The size of the exit pupil may be increased by integrating waveguides in an optical system, configured to in-couple light, propagate light within, and gradually out-couple light by means of diffraction or holographic elements or semi-transparent mirrors.

The term "multi-view picture" is a three-dimensional (3D) image generated from a plurality of views from different viewing angles. In example embodiments, the terms "multi-view picture" and "3D image" are used interchangeably.

The term "virtual image plane" is a plane where two planar images are generated, i.e., a stereopair.

The term "stereopair" is a pair of 2D images of the same object which depict views of the object from various points of observation of the object.

The term "augmented reality (AR)" is a technique of overlaying virtual objects on a real world scene. AR may apply virtual information to the real world such that the real world scene and the virtual objects are superimposed in one image or space, thereby providing an immersive experience to a viewer.

Example embodiments may generate two separate images for the left eye and the right eye and, by virtue of a parallax effect, generate a 3D image for a viewer.

Hereinafter, operations related to AR will be described through an example of a head-up display (HUD), but the description regarding the example of the HUD may also apply to other AR devices such as AR glasses.

FIG. 1 illustrates a scheme of generating a 3D image according to example embodiments. A 3D image may be generated based on a stereopair. The stereopair may include separate 2D images for the left eye ($x_L$, $y_L$, $z_L$) and the right eye ($x_R$, $y_R$, $z_R$). The resulting 3D image may be generated at a distance D (meters (m)) from a viewer. The position of the 3D image may be varied depending on the coordinates of a stereopair output. The signs of "arrow" and "50 m" shown in FIG. 1 may be 3D images that a driver views.

The 3D image may be generated using a stereo output technique, according to which planar images (e.g., a stereopair) are generated for the left eye and the right eye.

When the stereopair is viewed through both eyes, each eye may perceive a corresponding one of a pair of perspective images intended by the stereopair, whereby an effect of viewing a 3D image may be achieved.

The position of the 3D image may be changed by changing the images of the stereopair and their output coordinates on a virtual image plane.

Figure 2:
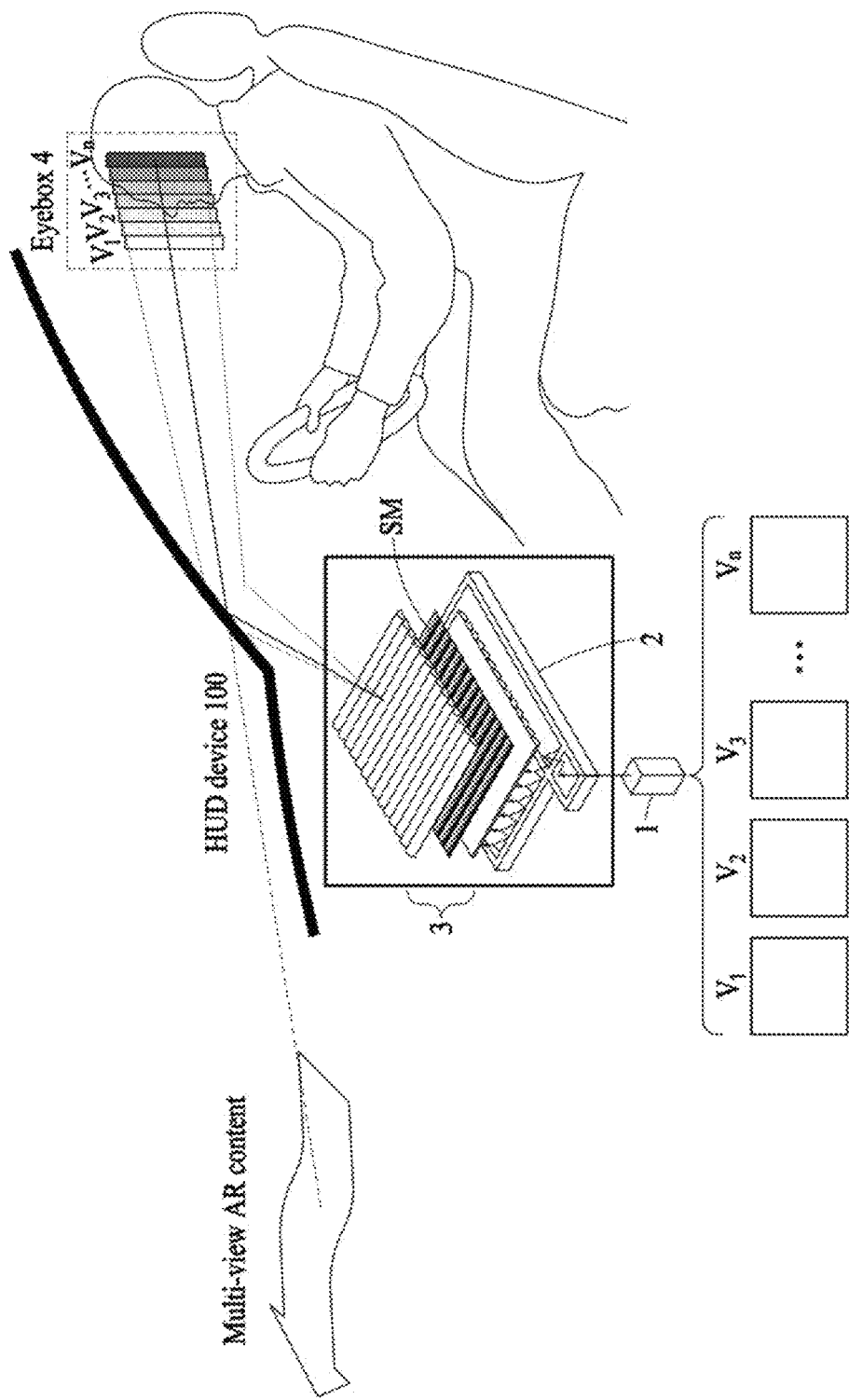
FIG. 2 illustrates elements configured to provide 3D augmented reality according to example embodiments.

A HUD device according to the example embodiments may implement 3D AR by replicating an exit pupil using the elements shown in FIG. 2.

FIG. 2 illustrates elements configured to provide 3D augmented reality according to example embodiments. FIG. 2 is an example of a HUD device 100, where a driver of a vehicle is outlined, and a solid line depicts the hood and windshield of the vehicle, and a dashed line stands for propagation of light exiting the HUD device 100. As indicated by the dashed line, the light emanates from the HUD device 100 and is reflected from the windshield towards the eyes of the driver. The driver may look through the windshield and view the road and a virtual image. The virtual image may be, for example, a 3D image generated by the HUD device 100.

The HUD 100 device may visualize a virtual content object in a visible region in front of a user. The HUD device 100 may visualize the virtual content object on a glass window in front of the user, for example, a windshield glass of the vehicle. The HUD device 100 may have an exit pupil replication function and provide AR through the 3D image. The HUD device 100 may include a multi-view picture generation unit (PGU) 1 configured to generate an image of at least two views (e.g., views $V_1$, $V_2$, . . . , $V_n$) or image patterns. The multi-view PGU 1 may include any one or any combination of a light source, a backlight unit, and an optical layer to generate an image. The views may have the same field of view (FOV) size but differ in light wavelength and/or polarization state, and/or view generation time (t). The views may have distinctions in light wavelength and/or polarization state, and/or view generation time (t).

The HUD device 100 may include a waveguide 2 which realizes the replication of an exit pupil of the multi-view PGU 1 and the generation of a virtual image in infinity, and an eyebox viewing zone generation unit 3 that includes a stack of at least two microlens or micromirror arrays and a spatial mask SM. The eyebox viewing zone generation unit 3 may be an optical system that provides a telescopic beam path for beams that exit the waveguide 2 and retain the angular distribution of the beams that exit the waveguide 2. A stack of two microlens arrays may be used in combination with the spatial mask which is located in an optically conjugate plane of the exit pupil of the HUD device 100 in respect of a second lens array. The stack of lens arrays may be configured to retain the angular direction of the beams, and the spatial mask may be located in a conjugate plane in respect of the area of the exit pupil and filter light such that viewing zones $V_1, V_2, \ldots, V_n$ are formed in an eyebox 4. The viewing zones in the eyebox may differ in terms of composition of light which corresponds to transmission filters of the spatial mask. Each viewing zone may provide one image generated by the multi-view PGU 1.

Figure 3:
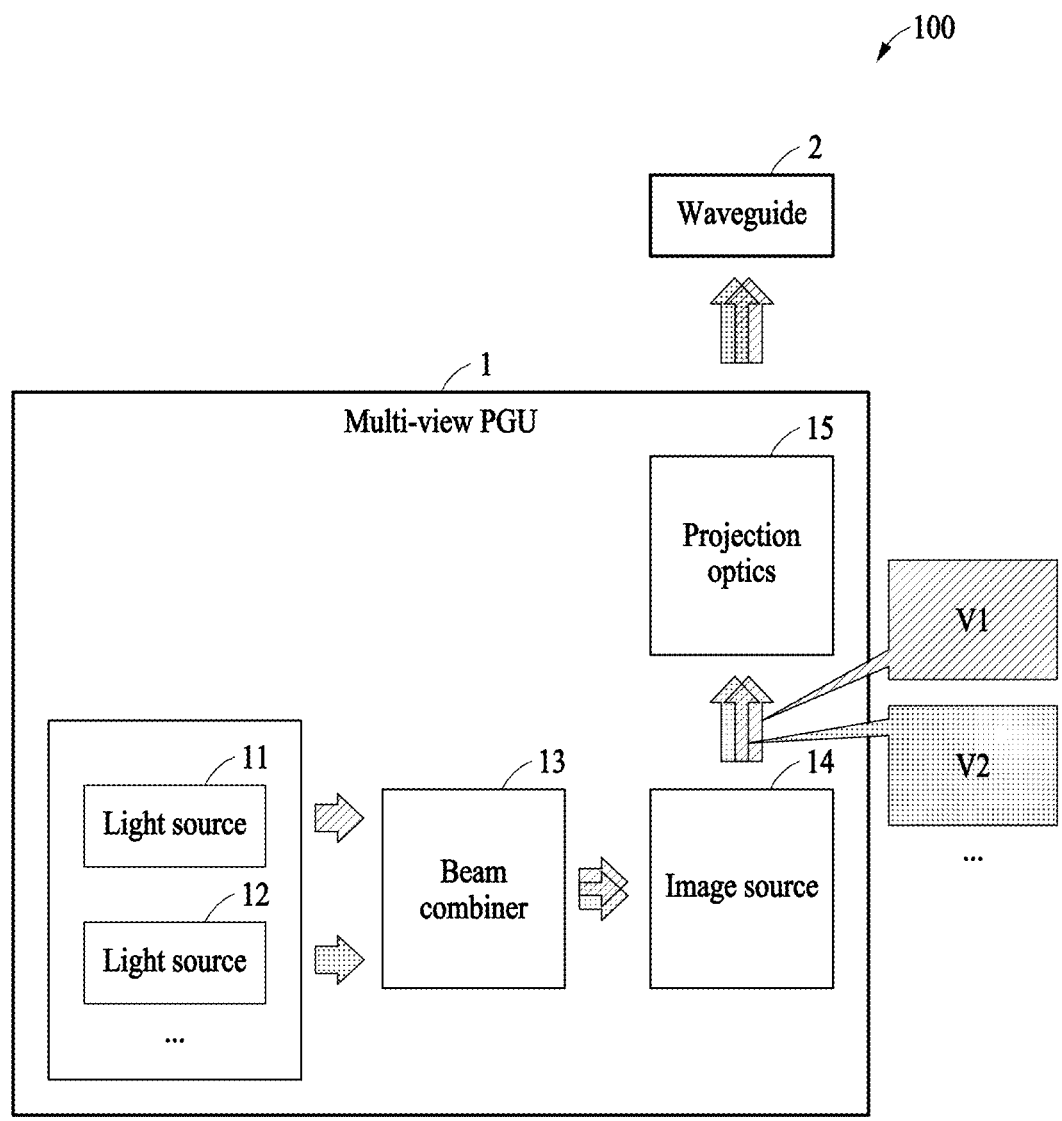
FIG. 3 illustrates a structure of a multi-view picture generation unit according to example embodiments.

FIG. 3 illustrates a structure of a multi-view PGU according to example embodiments.

The multi-view PGU 1 may be configured to generate a multi-view picture, and generate an exit pupil that includes the multi-view picture. The multi-view PGU 1 may include, as schematically shown in FIG. 3, at least two light sources 11 and 12, a beam combiner (or image combiner) 13, an image source 14, and projection optics 15. As aforementioned, the multi-view PGU 1 may be configured to generate at least two images, wherein the generated images may have the same (FOV) size but have distinctions. For example, the images may differ in light wavelength and/or polarization state, or in image generation time (t).

The multi-view PGU 1 together with the waveguide 2 may generate a virtual AR image.

In the case where the multi-view PGU 1 includes two or more light sources 11 and 12, the light sources 11 and 12 may be configured to emit light both with the same wavelength and with different wavelengths. For example, the light sources 11 and 12 may emit RGB light in bands of 450 to 480 nanometers (nm), 510 to 540 nm, and 610 to 650 nm, respectively. The light sources 11 and 12 may be light emitting diodes, laser diodes, or incandescent lamps. However, the wavelengths and types of the light sources 11 and 12 are not limited thereto.

The beam combiner 13 may be configured to mix and combine light from different sources and output the mixed light to the image source. The beam combiner 13 may be a dichroic mirror or multi-channel optics. For example, the beam combiner 13 may be a waveguide-based combiner.

The image source 14 may be a display (liquid crystal on silicon (LCOS), digital micromirror device (DMD), or micro electro mechanical system (MEMS) scanning system, which may display information by outputting text and/or graphic information.

The projection optics 15 may be an optical unit that includes at least one or more of: lenses, mirrors, polarization plates, and which may convert a spatial image into an angular image in the same FOV and transmit the angular image to the waveguide 2.

Thus, the multi-view PGU 1 may align and combine light that corresponds to each viewing zone and transmit it through the projection optics 15 to the waveguide 2.

The scheme of exit pupil image generation by means of the eyebox viewing zone generation unit 3 and the waveguide will be described with reference to FIG. 4.

Figure 4:
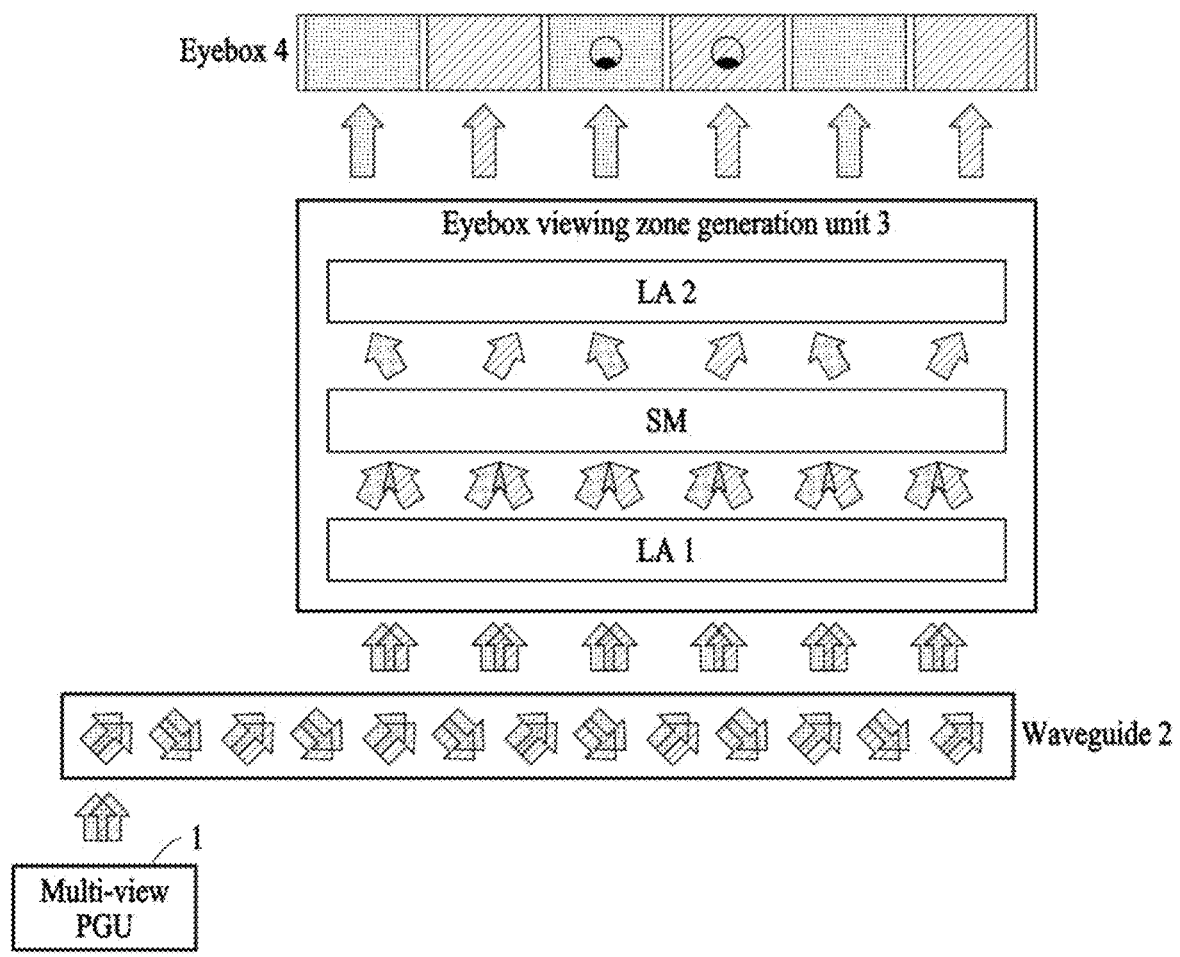
FIG. 4 illustrates a scheme of exit pupil image generation by an eyebox viewing zone generation unit and a waveguide according to example embodiments.

FIG. 4 illustrates a scheme of exit pupil image generation by an eyebox viewing zone generation unit and a waveguide according to example embodiments.

The eyebox viewing zone generation unit 3 may include at least two lens arrays LA1 and LA2. Each of the lens arrays LA1 and LA2 may include multiple cylindrical lenses or spherical lenses. The first microlens array LA1 may be configured to convert the angular distribution of a virtual image received from the waveguide 2 into a spatial image and in-couple the spatial image into a spatial mask SM. The second microlens array LA2 may be configured to convert the spatial image into an angular image. The microlens arrays LA1 and LA2 may together retain the angular directions of the images, and at the same time, the spatial mask SM may filter the light by wavelength and/or polarization state.

According to example embodiments, the spatial mask SM may be a thin layer of an absorbing material with light transmitting zones. The spatial mask SM may filter a predetermined wavelength band and/or a polarization state of light that is generated from the at least two light sources of the multi-view PGU 1 and replicated in the waveguide 2. The spatial mask SM may be configured to filter images according to the positions of the views in an exit pupil plane, taking into account wavelengths and polarization states of light emitted by the light sources in the multi-view PGU 1.

The waveguide 2 may be configured to replicate the exit pupil and generate a virtual image in infinity. The waveguide 2 may provide for pupil replication by means of two one-dimensional (1D) images (e.g., first along the X axis and then along the Y axis), or by means of one 2D image (e.g., along the X axis and the Y axis at the same time), and in-couple, translate, and out-couple the replicated exit pupil image generated by the multi-view PGU 1.

The replicated images, being out-coupled from the eyebox viewing zone generation unit 3, may reach the exit pupil plane in an AR device (e.g., a HUD device). A stereo image may be generated on the exit pupil plane, and in the case of the HUD, the stereo image may be viewed within the eyebox 4 by a driver and/or a passenger of a vehicle. Thus, the eyebox viewing zone generation unit 3 may generate a 3D image by outputting various images into the respective viewing zones.

Figure 5:
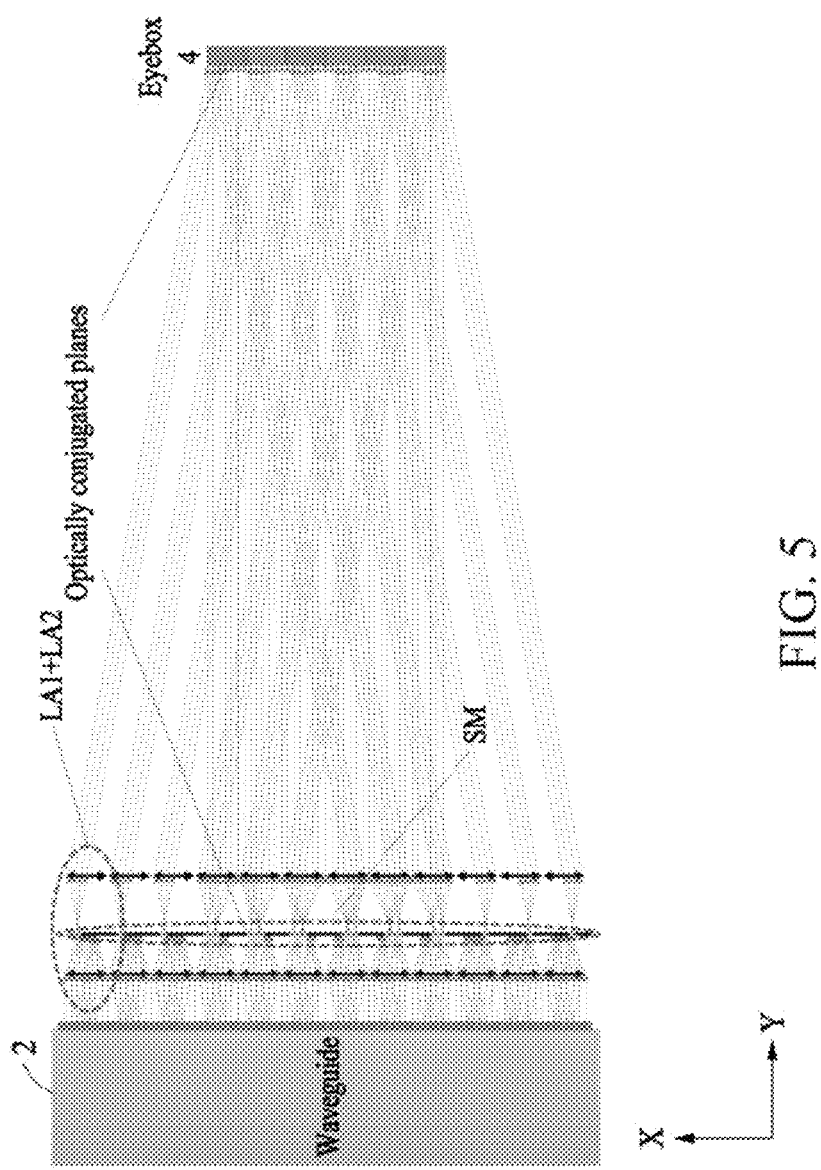
FIG. 5 illustrates a scheme of image generation in an exit pupil plane according to example embodiments.

FIG. 5 illustrates a scheme of image generation in an exit pupil plane according to example embodiments.

As aforementioned, the waveguide 2 may perform exit pupil replication, and mixed beams may be formed at an output of the waveguide 2. The output may correspond to the images for the right eye and the left eye generated by the multi-view PGU 1 and mixed with each other. The lens arrays LA1 and LA2 may be then arranged. The lens arrays LA1 and LA2 may have focal lengths so as to provide a telescopic beam path and generate a virtual image in infinity. The lens arrays LA1 and LA2 may be substantially a telescopic system that provides image generation in infinity.

The lens arrays LA1 and LA2 may be constituted by a combination of microlenses (e.g., cylindrical or spherical microlenses) which are horizontally arranged in sequence, for example, in the case of the HUD, along an axis (e.g., X-axis in FIG. 5) along which viewing zones of the eyebox 4 are arranged. The first lens array LA1 may focus the light onto a front focal plane of the second lens array LA2. The spatial mask SM may be arranged between the first lens array LA1 and the second lens array LA2. The spatial mask SM may be arranged in a plane which is optically conjugate with the exit pupil plane. The second lens array LA2 may translate the image of the spatial mask SM into the exit pupil plane. The spatial mask SM may be configured so as to generate viewing zones in the eyebox 4. The images in the viewing zones may differ in terms of spectral or polarization composition.

The spatial mask SM according to example embodiments may be configured to operate in an active or a passive mode.

In an active operation mode of the spatial mask SM, image displaying for each eye may be intermittently adjusted in accordance with time t.

In a passive operation mode of the spatial mask SM, several viewing zones may be simultaneously generated in the eyebox 4, and in this relation, the multi-view PGU 1 may include at least two image sources to generate respective viewing zones. As such, each image source may generate an image with a predetermined wavelength or polarization state that differs from those of the other image source in the multi-view PGU 1. Moreover, for each viewing zone, there may be a corresponding image that differs in terms of wavelength or polarization state. In the case of the HUD, when the vehicle moves, the position in the eyebox 4 of the driver may change, and an image corresponding to the new position may reach the eyes.

Figure 6:
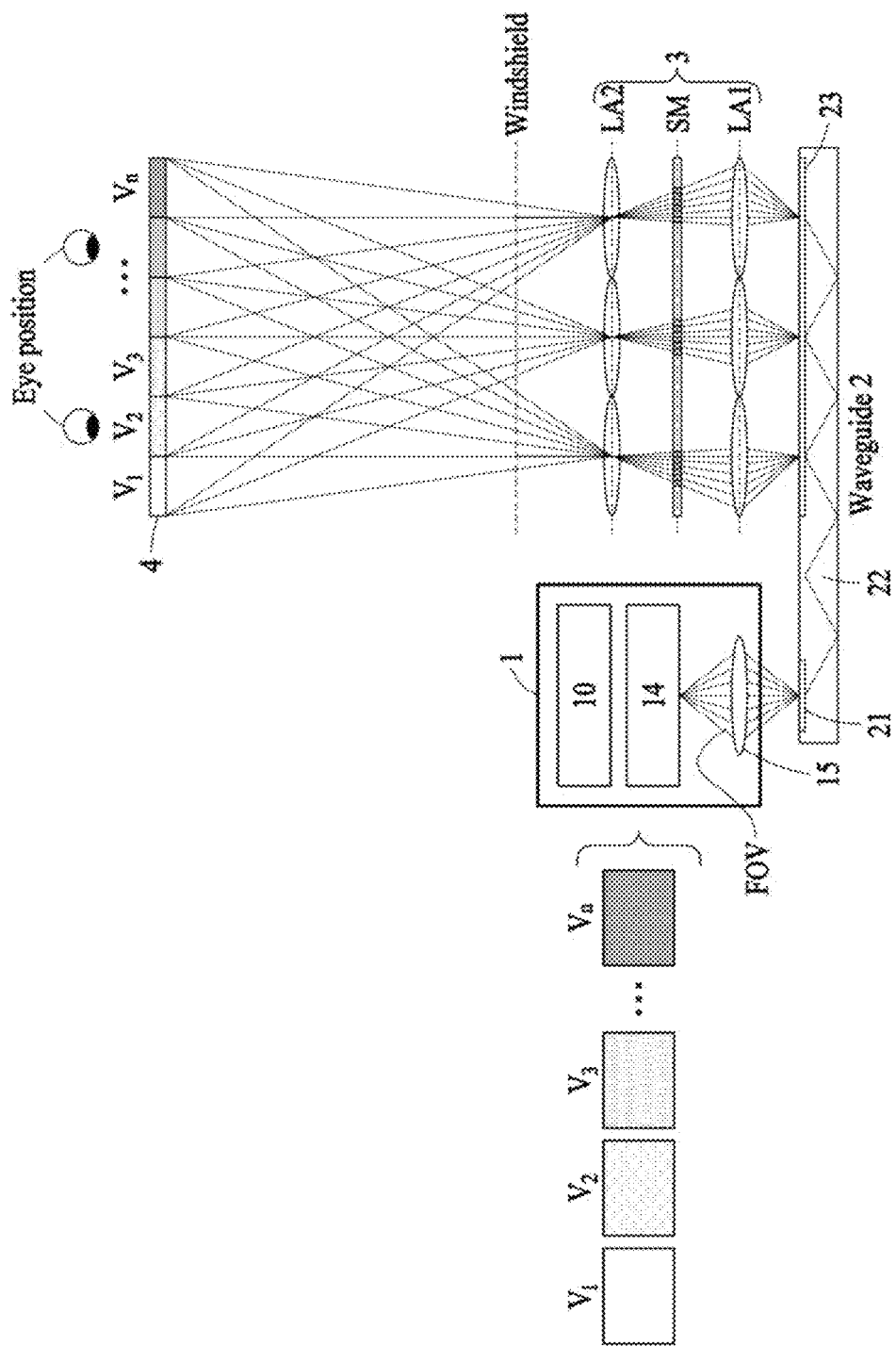
FIG. 6 illustrates a scheme of image generation in a passive operation mode of a spatial mask according to example embodiments.

FIG. 6 illustrates a scheme of image generation in a passive operation mode of a spatial mask according to example embodiments.

In the passive operation mode of the spatial mask SM, the multi-view PGU 1 may generate at least two views $V_1$ to $V_n$ which differ in terms of spectral composition or polarization state, and in the active operation mode of the spatial mask SM, the multi-view PGU 1 may generate at least two views $V_1$ to $V_n$ which are separated in time t.

Thus, the multi-view PGU 1 may include at least one light source 10 and at least one image source 14.

In an example embodiment, for example, in the passive operation mode of the spatial mask SM, the multi-view PGU 1 may include two or more light sources and one or more image sources. Although one light source 10 and one image source 14 are shown in FIG. 6, this is for ease of description and understanding. If there are two or more light sources, the two or more light sources may correspond to one image source. In this case, the image source may generate different images for each view at a predetermined frequency, and light sources may intermittently illuminate the image source (e.g., a display). In this case, filters in the spatial mask SM may remain constant in time.

Thus, the multi-view PGU 1 may generate at least two images for the right eye and the left eye, which differ in terms of wavelength and may form respective views $V_1$, $V_2$, ..., $V_n$ for viewing zones in the eyebox 4.

Light from the light source 10 may be transmitted through the projection optics 15 and reach the waveguide 2, which includes a flat substrate with an in-coupling element 21, an expander 22, and an out-coupling element 23 embedded therein. The waveguide 2 may be embodied as diffraction elements, such as diffractive gratings. The waveguide 2 may be configured to replicate the pupil along one axis (e.g., the X axis or the Y axis) and along two axes (e.g., both the X axis and the Y axis). The waveguide may be configured for in-coupling an image, propagating the image within the waveguide 2, and out-coupling the image generated in the multi-view PGU 1. A more detailed description of the waveguide 2 will be provided with reference to FIGS. 8A to 8C.

Then, the image may reach the eyebox viewing zone generation unit 3, which may provide a telescopic path of the beams that exit the waveguide 2 and retain the angular distribution of the beams that exit the waveguide 2. The eyebox viewing zone generation unit 3 may include a stack of two microlens arrays LA1 and LA2 and be used in combination with the spatial mask SM which lies in an optically conjugate plane of the exit pupil in respect of the second lens array LA2. Alternatively, a different number of (e.g., three or more) arrays may be used.

It should be noted that the number of arrays in the stack included in the eyebox viewing zone generation unit 3 may be greater and may be defined by the need for increasing the FOV of the optical system and/or the need for correcting optical aberrations.

The spatial mask SM may be a thin layer of absorbing material with alternating dichroic filter segments embedded therein. Each of the filter segments in the spatial mask SM may transmit light with a predetermined wavelength that corresponds to the wavelength of the light source 10 in the multi-view PGU 1 and to the respective viewing zone. The stack of lens arrays LA1 and LA2 may be configured to retain the angular direction of the beams, and the spatial mask SM may be in the conjugate plane with the eyebox 4 and filter the light such that viewing zones corresponding to the views $V_1$, $V_2$, ..., $V_n$ may be formed in the eyebox 4. In the case of the HUD, light may be reflected in the plane of the windshield of the vehicle after passing through the eyebox viewing zone generation unit 3, and may propagate to the plane of the eyebox 4. The viewing zones in the eyebox 4 may differ in terms of composition of light. The light may correspond to dichroic transmission filters in the spatial mask SM. Each viewing zone may provide for viewing one image generated by the multi-view PGU 1.

The multi-view PGU 1 may include at least one image source 14. The number of image sources may be "1", "2", ..., "n". When the image source 14 includes multiple image sources, each image source may include its own image for each of the views $V_1$, $V_2$, ..., $V_n$ of the viewing zones and operate at a predetermined wavelength $\lambda_1$, $\lambda_2$, ..., $\lambda_n$, which correspond to their respective viewing zones in the eyebox 4 area.

The multi-view picture may be generated in the multi-view PGU 1 by combining the images from different image sources (e.g., 1, 2, ..., n image sources). Each of the image sources may operate at a predetermined wavelength $\lambda_1$, $\lambda_2$, ..., $\lambda_n$. Each image source may have a respective scanning mirror $M_1$, $M_2$, ..., $M_n$, which will be described with reference to FIGS. 7A and 7B.

Figure 7A:
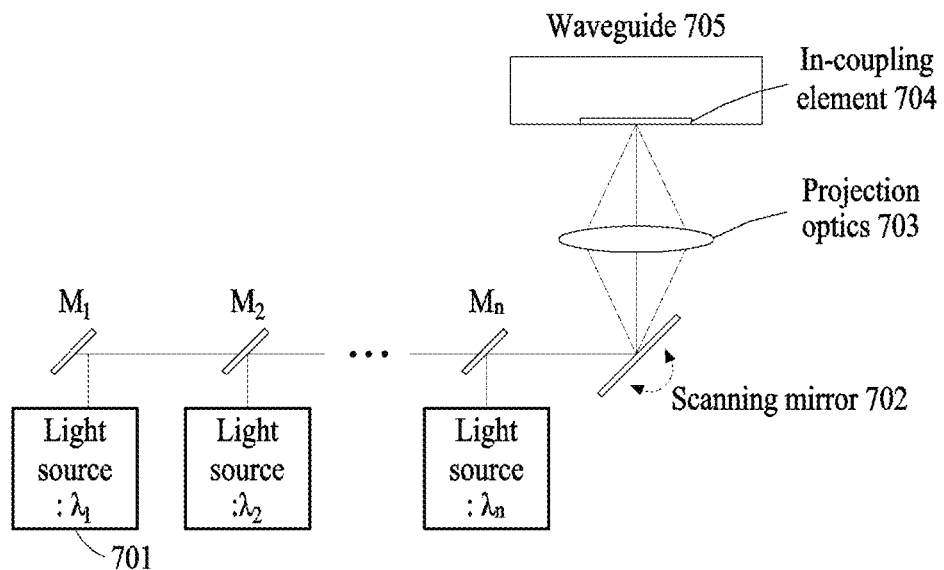
FIGS. 7A and 7B illustrate image sources and an operating wavelength of a scanning mirror according to example embodiments.
Figure 7B:
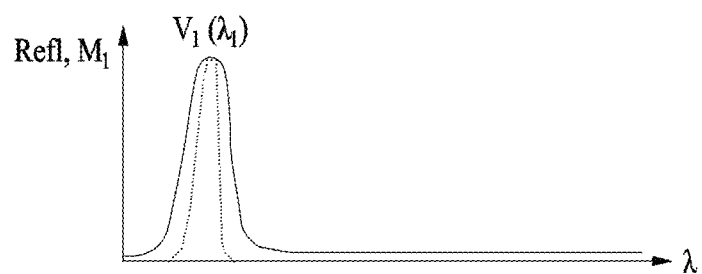

FIGS. 7A and 7B illustrate image sources and an operating wavelength of a scanning mirror according to example embodiments.

The reflectance spectrum of a mirror $M_1$ may correspond to the emission spectrum of a light source 701 that emits light of wavelength $\lambda_1$. The wavelength $\lambda_1$ may correspond to a viewing zone where the view $V_1$ is viewed in the eyebox, and the mirror $M_1$ may only reflect light with wavelength $\lambda_1$ as shown in FIG. 7A. The reflected light may be provided to a waveguide 705 through a scanning mirror 702, projection optics 703, and an in-coupling element 704. The reflectance spectrum of the mirror $M_n$ may correspond to the emission spectrum of a light source that emits light of wavelength $\lambda_n$, and the mirror $M_n$ may only reflect light with wavelength $\lambda_n$ which corresponds to a viewing zone of the view $V_n$. The graph shown in FIG. 7B illustrates a dependency between the reflectance coefficient of the mirror $M_1$ and the wavelength $\lambda_1$ of the light emitted by the light source 701.

The spatial mask SM may be configured to transmit light in accordance with the number of views n. The spatial mask SM may be a thin layer of absorbing material with alternating dichroic filter segments embedded therein. Each of the filter segments in the spatial mask SM may transmit light with a predetermined wavelength that corresponds to the wavelength of the light source in the multi-view PGU and to the respective viewing zone. All views may be generated in the same FOV but then separated in space based on spectral composition and generate viewing zones in the eyebox.

The multi-view PGU may be configured to operate in several modes.

1) First Mode: The multi-view PGU may be configured to generate a multi-view picture by combining an n number of images having one FOV but differing in wavelength (e.g., $\lambda_1, \lambda_2, \ldots, \lambda_n$), wherein n is a natural number greater than or equal to 2. A spatial mask SM may be used, in which light is filtered based on respective wavelengths to simultaneously generate viewing zones in the eyebox, wherein images in the viewing zones may differ in wavelengths.

2) Second Mode: The multi-view PGU provides for the generation of a stereo image by generating only two images in two viewing zones, using the two image sources, but in order to enable viewing the images with the left eye and the right eye when the eyes move, the spatial mask SM may be shifted along the horizontal axis (e.g., the X axis). This is because images are output for the right eye and the left eye in an alternating manner with one spectral composition or polarization state.

3) Third Mode: The multi-view PGU may be configured to generate a multi-view picture by combining an n number of images with the same FOV but different polarization states (e.g., S polarization, P polarization, right-hand circular polarization (RHCP), and left-hand circular polarization (LHCP)).

4) Fourth Mode: The multi-view PGU may generate a stereo image by using one image source with one spectral composition or polarization state and adjust the operation of the spatial mask so as to display images in an alternating manner for the right eye and the left eye (the active operation mode of the spatial mask).

The waveguide will be further described with reference to FIGS. 8A to 8C.

Figure 8A:
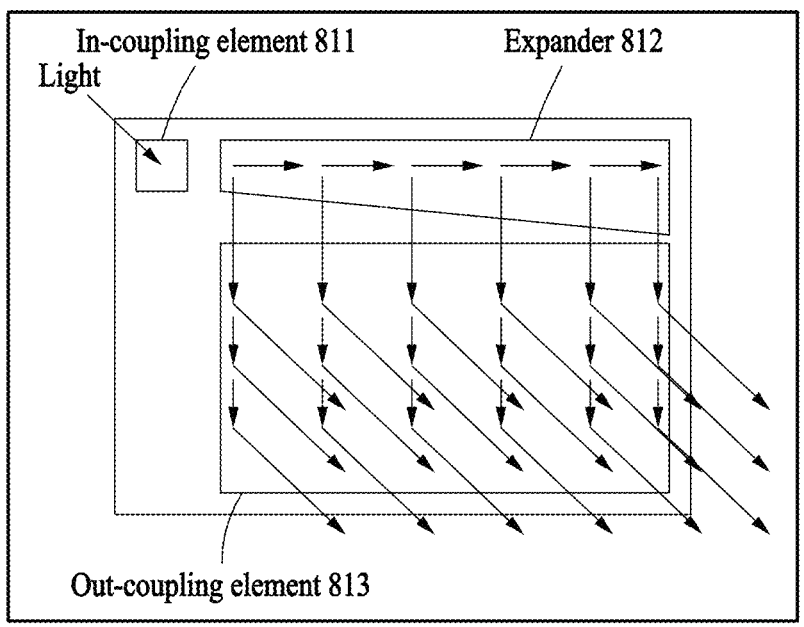
FIGS. 8A to 8C illustrate structures of waveguides according to example embodiments.
Figure 8B:
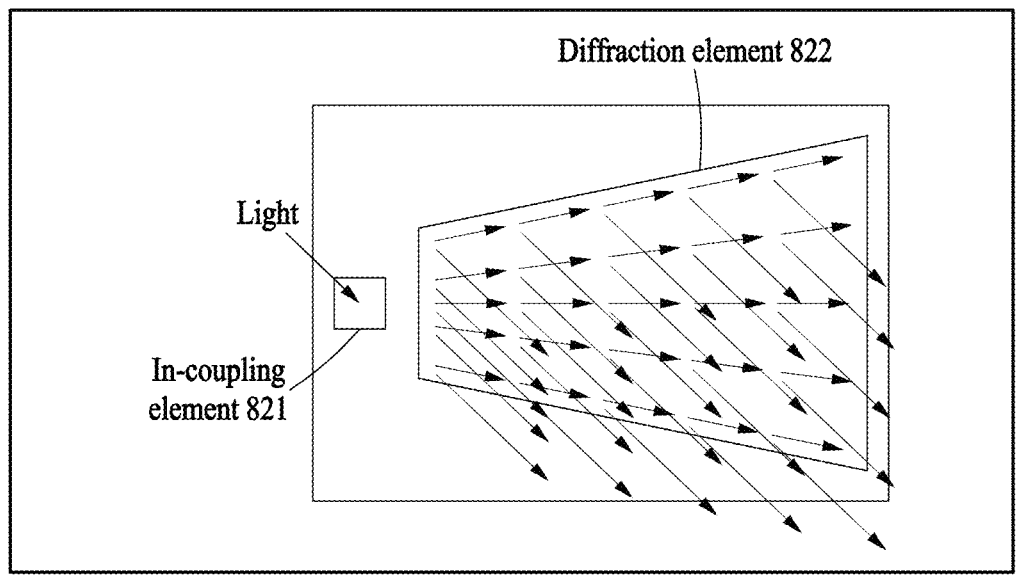
Figure 8C:
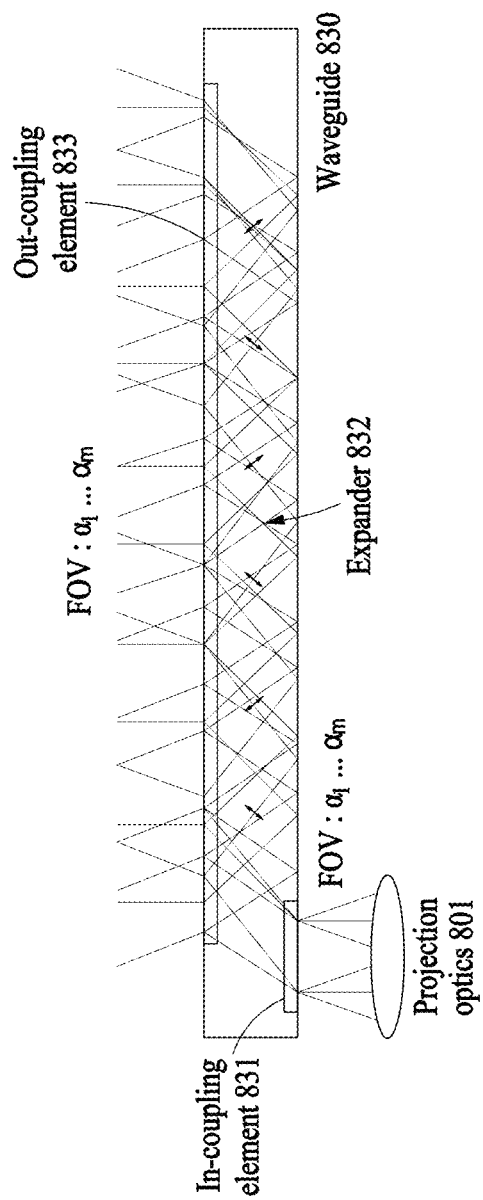

FIGS. 8A to 8C illustrate structures of waveguides according to example embodiments.

A waveguide may be a thin flat substrate with an in-coupling element, an out-coupling element, and an expander embedded therein in the form of diffraction elements. For example, the diffraction elements may include diffractive gratings, holographic optical elements, and semi-transparent mirrors. The waveguide may replicate the pupil along one axis (e.g., the X axis) and then along the other axis (e.g., the Y axis), as shown in FIG. 8A. Further, the waveguide may replicate the pupil simultaneously along two axes (e.g., the X axis and the Y axis), as shown in FIG. 8B.

Meanwhile, referring to FIG. 8A, an in-coupling element 811 may be configured to in-couple light in the waveguide with a predetermined beam angle. An expander 812 (or replicator) may be configured to replicate the in-coupled light within the waveguide along one axis (e.g., the X axis) and redirect the light into an area of an out-coupling element 813. The out-coupling element 813 may be configured to replicate the light along the other axis (e.g., the Y axis) and out-couple light from the waveguide. FIG. 8B shows a structure of a waveguide where pupil replication is not performed in an alternating manner on each axis, but simultaneously on two axes. In this case, an in-coupling element 821 may be configured to in-couple light in the waveguide with a predetermined beam angle. An expander and an out-coupling element may be combined in one diffraction element 822, which may simultaneously replicate light along the two axes (e.g., the X axis and the Y axis) and out-couple the light from the waveguide at a predetermined beam angle.

For example, a 3-color image may be generated through the following configurations: Here, for example, three colors may be red, green, and blue, and these may be referred to as R, G, and B.

a) a combination of three waveguides, where each waveguide is for a predetermined color (e.g., R, G, or B);

b) a combination of two waveguides, where colors are combined, and for example, one waveguide is for B+G, and the other one is for R, or alternatively, one waveguide is for G+R, and the other one is for B;

c) one waveguide with combined colors (e.g., R+G+B); and d) a waveguide corresponding to a combination of different waveguides, where each waveguide is intended for transmitting one angular portion of the common image for a predetermined color (e.g., R, G, or B) and/or combination of colors (e.g., R+G or R+G+B).

The in-coupling and out-coupling elements may be diffractive or holographic elements or semi-transparent mirrors.

FIG. 8C shows a cross-sectional view of a waveguide that performs one-dimensional (1D) replication. Referring to FIG. 8C, a waveguide 830 may include an in-coupling element 831, an expander 832, and an out-coupling element 833, and provide images in FOVs $\alpha_1, \ldots, \alpha_m$ which are the same as the FOVs $\alpha_1, \ldots, \alpha_m$ of the images provided through projection optics 801. $\alpha_1, \ldots, \alpha_m$ may be a range of variations of the light directions. The images may be output into the eyebox, thus generating a virtual image at various distances that continuously change from a user.

FIGS. 9A and 9B illustrate a filtering operation of a spatial mask according to example embodiments.

FIG. 9A schematically shows a graph of dependency between the transmittance coefficient of the filter of the spatial mask and wavelength and respective mask segments.

The number of filters $F_1, F_2, \ldots, F_n$ in each mask segment may correspond to the number of viewing zones in an eyebox 901 corresponding to views $V_1, V_2, \ldots, V_n$. The filters $F_1, F_2, \ldots, F_n$ may have a transmittance which corresponds to wavelength $\lambda_1, \lambda_2, \ldots, \lambda_n$. The graph may depict the correspondence between the transmittance of the filter $F_1$ and the wavelength $\lambda_1$. Thus, an image source and a respective viewing zone may correspond to each dichroic filter $F_1, F_2, \ldots, F_n$ of the spatial mask. The reflectance coefficients of the mirrors $M_1, M_2, \ldots, M_n$ (see FIG. 7A) for respective wavelengths $\lambda_1, \lambda_2, \ldots, \lambda_n$ may be equal to the transmittance coefficients of the filters $F_1, F_2, \ldots, F_n$ for respective wavelengths $\lambda_1, \lambda_2, \ldots, \lambda_n$.

Images of views $V_1, V_2, \ldots, V_n$ may differ from each other. For example, if n=6, then the images of views $V_1, V_2$, and $V_3$ may be combined for one eye, and the images of views $V_4, V_5$, and $V_6$ may be combined for the other eye. In the case of the HUD, in each position of the eyes of the driver, each eye may view its respective image.

FIG. 9B shows a scheme of generating views in the eyebox 901 when the spatial mask operates in a passive operation mode. In the case of the HUD, the driver may view different images (e.g., stereo images or pseudo 3D images) of the same object that show views $V_1$ to $V_n$ of this object from different points of view on this object.

Each segment of the spatial mask SM with a filter may be characterized by its respective light transmittance coefficient F adjusted for a respective wavelength λ with which the corresponding image source operates (see FIG. 9A).

In this respect, the longitudinal dimension of filter segments in the spatial mask SM may be defined as follows.

$$W'_{EB} = M \times W_{EB} \quad \text{[Equation 1]}$$

$W'_{EB}$ denotes the longitudinal dimension of a filter segment of the spatial mask SM, $W_{EB}$ denotes the longitudinal dimension of the exit pupil of the AR device (e.g., HUD device), and M denotes the magnification of the second lens array LA2. $W'_{EB}$ and $W_{EB}$ may be in millimeters (mm).

$$M = -\alpha'_{EB}/\alpha_{EB} \quad \text{[Equation 2]}$$

$\alpha'_{EB}$ denotes the distance between the spatial mask SM and the second lens array LA2, and $\alpha_{EB}$ denotes the distance between the second lens array LA2 and the exit pupil of the AR device (e.g., HUD device). $\alpha'_{EB}$ and $\alpha_{EB}$ may be in mm.

The distance between the spatial mask SM and the second lens array LA2 may be defined as follows.

$$\alpha'_{EB} = \frac{1}{\frac{1}{f_{LA2}} - \frac{1}{\alpha_{EB}}} \quad \text{[Equation 3]}$$

$f_{LA2}$ denotes the focal length of a unit lens of the second lens array LA2. $f_{LA2}$ may be in mm.

The stack of lens arrays may be configured such that focal lengths and lens positions in the lens arrays LA1 and LA2 are selected so as to form a telescopic beam path. For example, beams may be parallel at the input and output of the lens array, and a virtual image may be generated in infinity through this. The combination of lenses in the lens array may be selected to be in the form of either lenticular lenses (e.g., cylindrical lenses), or a set of spherical lenses. The number of lenses in the lens array may be "1" to "n". The number of lenses in the first lens array LA1 may correspond to the number of lenses in the second lens array LA2.

Figure 10A:
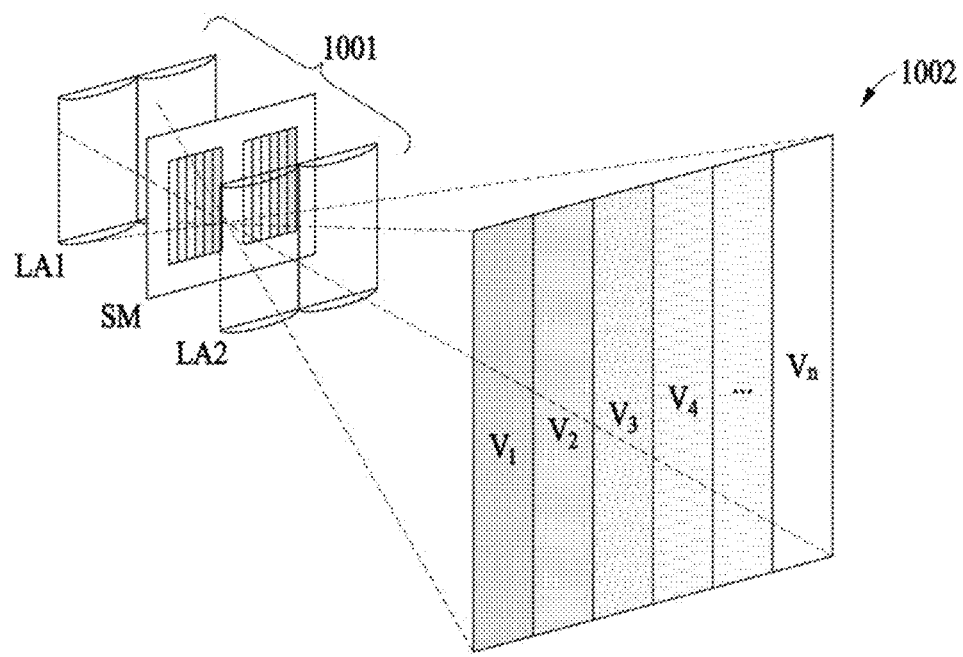
FIGS. 10A and 10B illustrate structures of lens arrays and an eyebox viewing zone generation unit according to example embodiments.
Figure 10B:
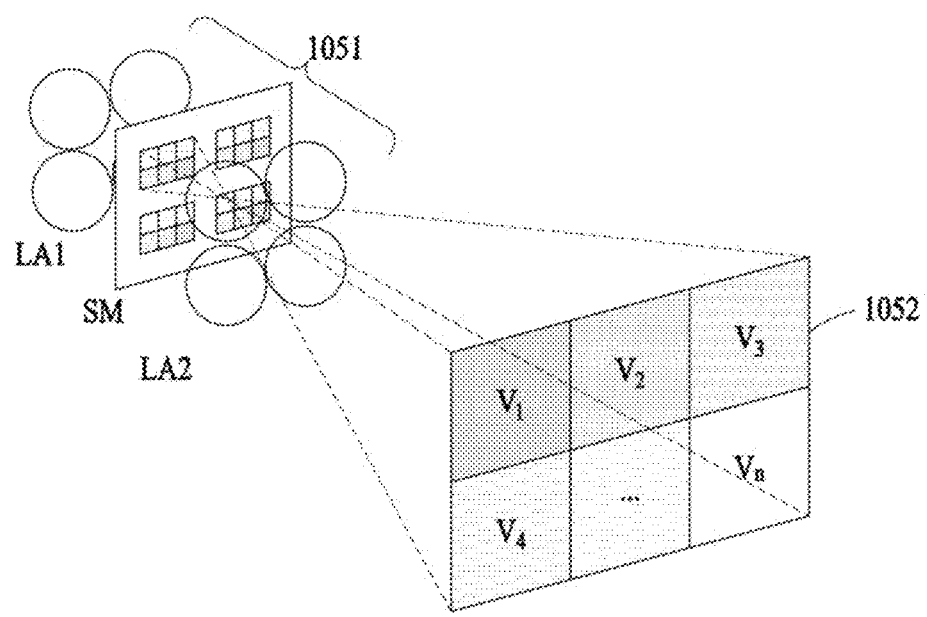

FIGS. 10A and 10B illustrate structures of lens arrays and an eyebox viewing zone generation unit according to example embodiments.

FIG. 10A shows an example of using lens arrays LA1 and LA2 including cylindrical lenses. Cylindrical lenses in the lens arrays LA1 and LA2 may be arranged along a horizontal axis which is coaxial to the position of the eyes of the user, and an eyebox viewing zone generation unit 1001 including two lens arrays LA1 and LA2 and the spatial mask SM may be present. In this case, viewing zones 1002 of the views V, $V_2$, ..., $V_n$ may be generated so as to be distributed along only one axis. In such configuration of cylindrical lenses in the arrays, the viewing zones 1002 may be only generated on one axis. FIG. 10B shows an example in which an eyebox viewing zone generation unit 1051 uses lens arrays LA1 and LA2 including spherical lenses. In this example, the spherical lenses in the lens arrays LA1 and LA2 may generate viewing zones 1052 along two axes.

Figure 11A:
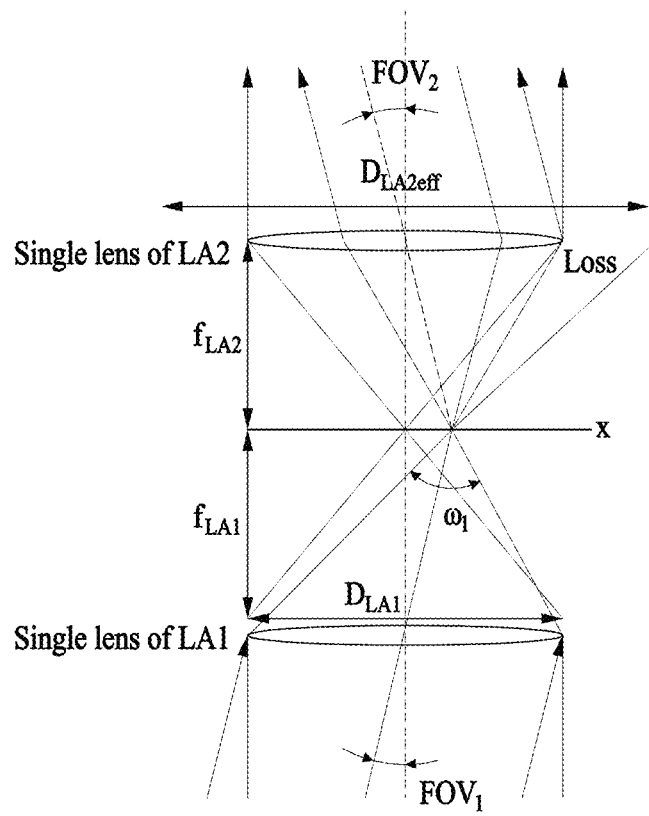
FIGS. 11A and 11B illustrate beam paths in a stack of microlens arrays LA1 and LA2 according to example embodiments.
Figure 11B:
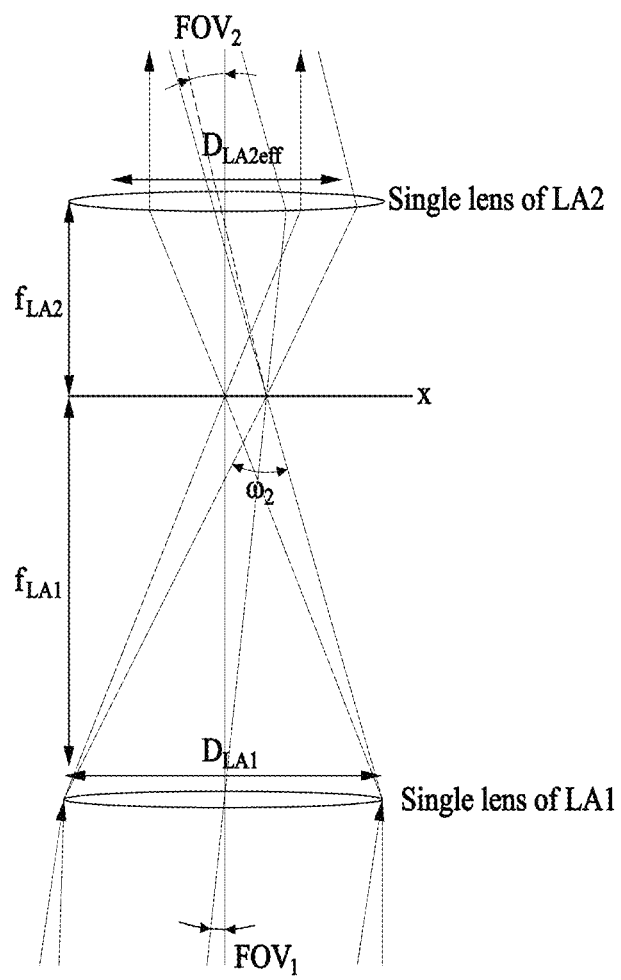

FIGS. 11A and 11B illustrate beam paths in a stack of microlens arrays LA1 and LA2. FIGS. 11A and 11B show by way of an example a unit lens of the first array LA1 and a unit lens of the second array LA2.

As aforementioned, the lens arrays LA1 and LA2 may be selected so as to provide a telescopic beam path at the input and at the output of the optical system. The angular magnification provided by the stack of lens arrays may be expressed as follows.

$$M_{LA} = f_{LA1}/f_{LA2} \quad \text{[Equation 4]}$$

Mu denotes the angular magnitude, $f_{LA1}$ denotes the focal length of the unit lens in the first lens array LA1, and fA2 denotes the focal length of the unit lens in the second lens array LA2. Each focal length may be in mm.

In the example of FIG. 11A, the following conditions may be derived:

1) $f_{LA1} = f_{LA2}$,
where the focal distances f of the lenses included in the lens arrays LA1 and LA2 may be equal.

2) $FOV_1 = FOV_2$,
where the field of view $FOV_1$ at the input of the stack of lens arrays may be equal to the field of view $FOV_2$ at the output.

3) $M_{LA} = 1$,
where the angular magnification $M_{LA}$ of the lens arrays may be "1".

4) $D_{LA2eff} > D_{LA2}$,
where $D_{LA2eff}$ denotes the effective diameter of the unit lens in the second lens array LA2, that is, the aperture through which the light is transmitted without energy losses, where $D_{LA2}$ denotes the actual diameter of the unit lens in the second lens array LA2, where $D_{LA2eff}$ and $D_{LA2}$ may be in mm.

The effective diameter of the lenses in the second lens array LA2 may be greater than the actual diameter of the lenses in the second lens array LA2, which may cause losses of useful light.

In the example of FIG. 11B, the following conditions may be derived:

1) $f_{LA1} > f_{LA2}$,
where the focal lengths f of the unit lenses in the first and second lens arrays LA1 and LA2 may be different, where, for example, the focal length $f_{LA1}$ of the unit lens in the first lens array LA1 may be greater than the focal length $F_{LA2}$ of the unit lens in the second lens array LA2.

2) $FOV_1 < FOV_2$,
where the field of view $FOV_1$ at the input of the stack of lens arrays may be smaller than the field of view $FOV_2$ at the output.

3) $M_{LA} > 1$,
where the angular magnification $M_L$A of the lens arrays is greater than "1".

4) $D_{LA2eff} < D_{LA2}$,
where the effective diameter of the unit lens in the second lens array LA2 may be smaller than the actual diameter of the unit lens in the second lens array LA2, and in this case, there may be no energy losses in the system.

Thus, the efficiency of the AR device (e.g., HUD device) may be improved such that:

1) the field of view FOV, in which the light is out-coupled from the waveguide, may be selected so as to be smaller than the ultimate field of view FOV formed at the output of the lens arrays LA1 and LA2, and 2) the aperture $D_{LA2eff}$ of the second lens array LA2 may be selected so as to prevent stripes in the virtual image, for which purpose a diffuser may be provided in the plane of the spatial mask.

Figure 12A:
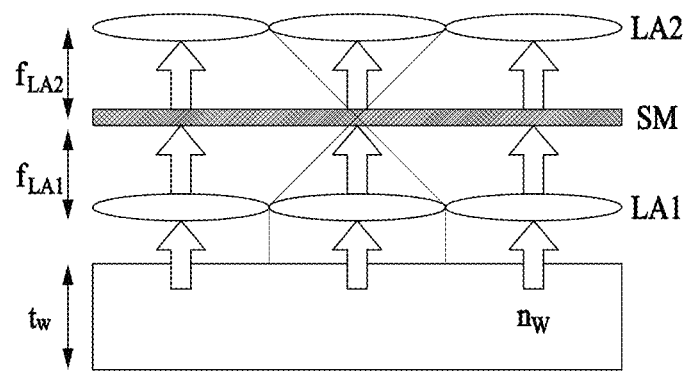
FIGS. 12A and 12B illustrate light paths in an eyebox viewing zone generation unit and a waveguide according to example embodiments.
Figure 12B:
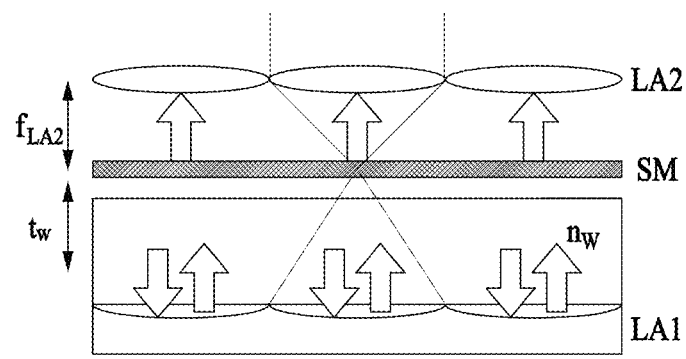

FIGS. 12A and 12B illustrate light paths in an eyebox viewing zone generation unit and a waveguide according to example embodiments.

Referring to FIG. 12A, an eyebox viewing zone generation unit may include at least two lens arrays LA1 and LA2. The number of lens arrays being "2" may be provided by way of a non-limiting example, and the eyebox viewing zone generation unit may include a different number (e.g., three or more) lens arrays. Each of the lens arrays LA1 and LA2 may include multiple cylindrical lenses or spherical lenses. $f_{LA1}$ denotes the focal length of a unit lens in the first lens array LA1, $f_{LA2}$ denotes the focal length of a unit lens in the second lens array LA2, $t_w$ denotes the thickness of the waveguide, and $n_w$ denotes the refraction index of the waveguide.

The first lens array LA1 may be configured to convert an angular distribution of the virtual image received from the waveguide into a spatial image, and in-couple the latter into the spatial mask SM. The second lens array LA2 may be configured to convert the spatial image into an angular image. The first and the second lens arrays LA1 and LA2 may together retain the angular directions of the images while filtering the light based on wavelength and/or polarization state. The filtering may be performed by the spatial mask SM. The first lens array LA1 may be integrated in the out-coupling element of the waveguide and out-couple light and focus light on the spatial mask SM. Such configuration may reduce the size of the device while retaining the quality of the generated 3D image.

Referring to FIG. 12B, the first lens array LA1 may be a mirror array including multiple mirrors. The second lens array LA2 may include multiple cylindrical lenses or spherical lenses. The first microlens array LA1 may be arranged under the waveguide, and the light from the waveguide may propagate downwards into the first lens array LA1. The first lens array LA1 may be configured to convert the angular distribution of the virtual image received from the waveguide into a spatial image and in-couple the spatial image into the spatial mask SM. The second lens array LA2 may be configured to convert a spatial image into an angular image.

The thickness $t_w$ of the waveguide may be equal to the focal length $f_{LA1}$ of a unit mirror of the first lens array LA1. If the condition of $f_{LA1}=t_w/n_w$ is satisfied, then the thickness of the AR device (e.g., HUD device) may be significantly reduced. In this case, the thickness of the device may be reduced by the amount of focal length $f_{LA1}$ of the first lens array LA1. One of the operation modes of the AR device (e.g., HUD device) is to generate a stereo image by generating only two images in two viewing zones using two image sources, but in order to provide image viewing with the left eye and the right eye when the eyes move, the spatial mask SM may be displaced along the horizontal axis (e.g., the X axis), which allows outputting images with one spectral composition or polarization state for the right eye and the left eye in an alternating manner.

Such operation modes of the AR device (e.g., HUD device) will be described in more detail with reference to FIGS. 13A and 13B.

Figure 13A:
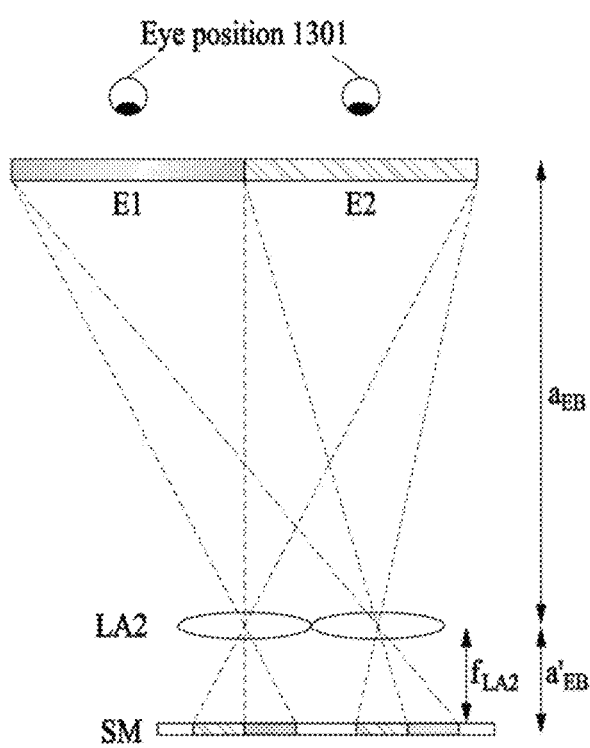
FIGS. 13A and 13B illustrate schemes of generating images in viewing zones according to example embodiments.
Figure 13B:
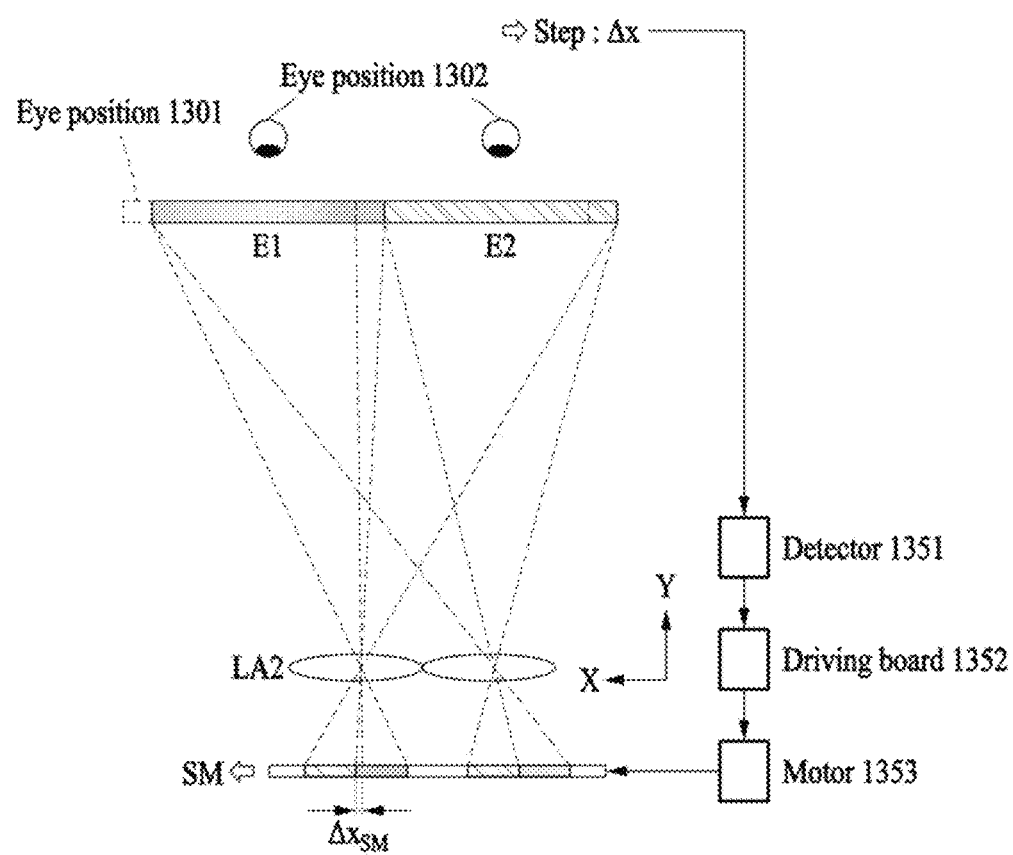

FIGS. 13A and 13B illustrate schemes of generating images in viewing zones according to example embodiments.

FIG. 13A shows a scheme of generating two viewing zones E1 and E2 of two different views without a movement of the eyes of a user (e.g., a driver of a vehicle). $\alpha'_{EB}$ denotes the distance between the spatial mask SM and the second lens array LA2, $\alpha_{EB}$ denotes the distance between the second lens array LA2 and the exit pupil of the AR device (e.g., HUD device), and $f_{LA2}$ denotes the focal length of the unit lens in the second lens array LA2. The magnification of the second lens array LA2 may be defined as expressed by Equation 2 described above.

FIG. 13B shows a scheme of generating two viewing zones E1 and E2 of two different views when the eyes of the user (e.g., the driver of the vehicle) move. For example, the eyes may move by an amount of $\Delta x$ from an eye position 1301 to an eye position 1302. The movement of the eyes may be tracked through an eye detector (e.g., an eye tracking sensor including a camera) 1351, and a signal from the eye detector 1351 may be provided to a control unit (e.g., a driving board 1352, an analog circuit including an analog-to-digital converter, and a digital circuit). The control unit may calculate a necessary amount of shift of the spatial mask SM along the horizontal axis (e.g., the X axis). The amount of shift may be calculated in real time as $\Delta x_{SM}=M*\Delta x$. $\Delta x_{SM}$ denotes the amount of shift, M denotes the magnification of the second lens array LA2, and $\Delta x$ denotes the movement of the eyes from a reference position. $\Delta x$ may be in mm.

In order to adjust the width (profile) of the viewing zones E1 and E2, adjustment of the position of the spatial mask SM along the Z axis may be considered.

An actuator device (e.g., a motor 1353) may move the spatial mask SM based on a signal from the control unit.

Figure 14A:
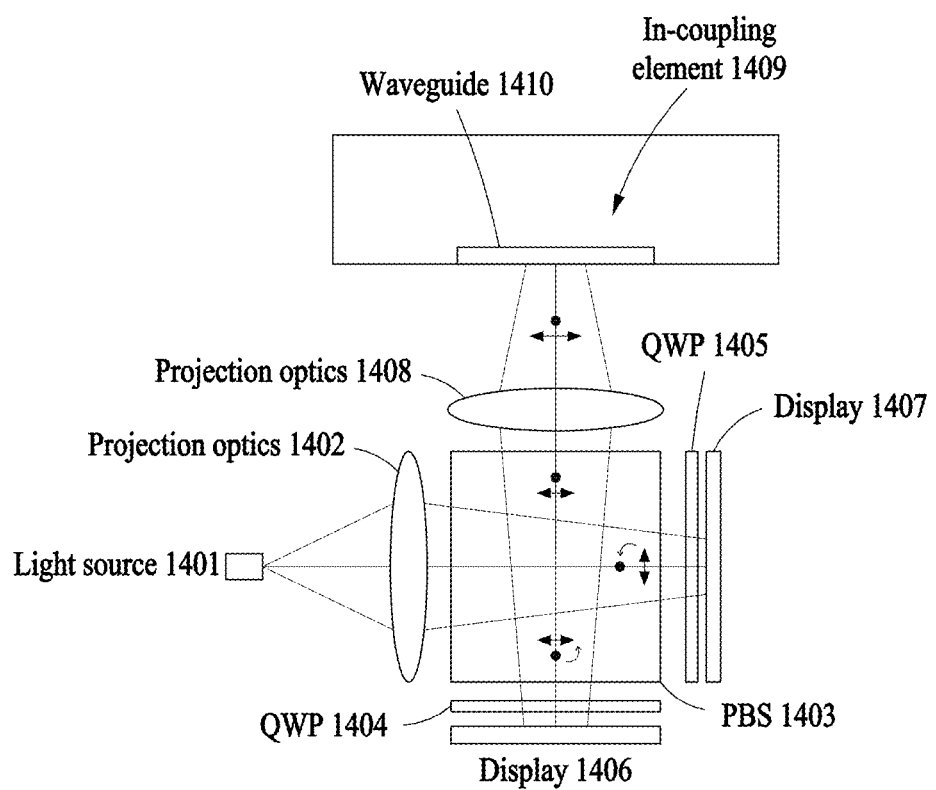
FIGS. 14A and 14B illustrate structures of multi-view picture generation units (PGUs) providing various light sources and image sources according to example embodiments.
Figure 14B:
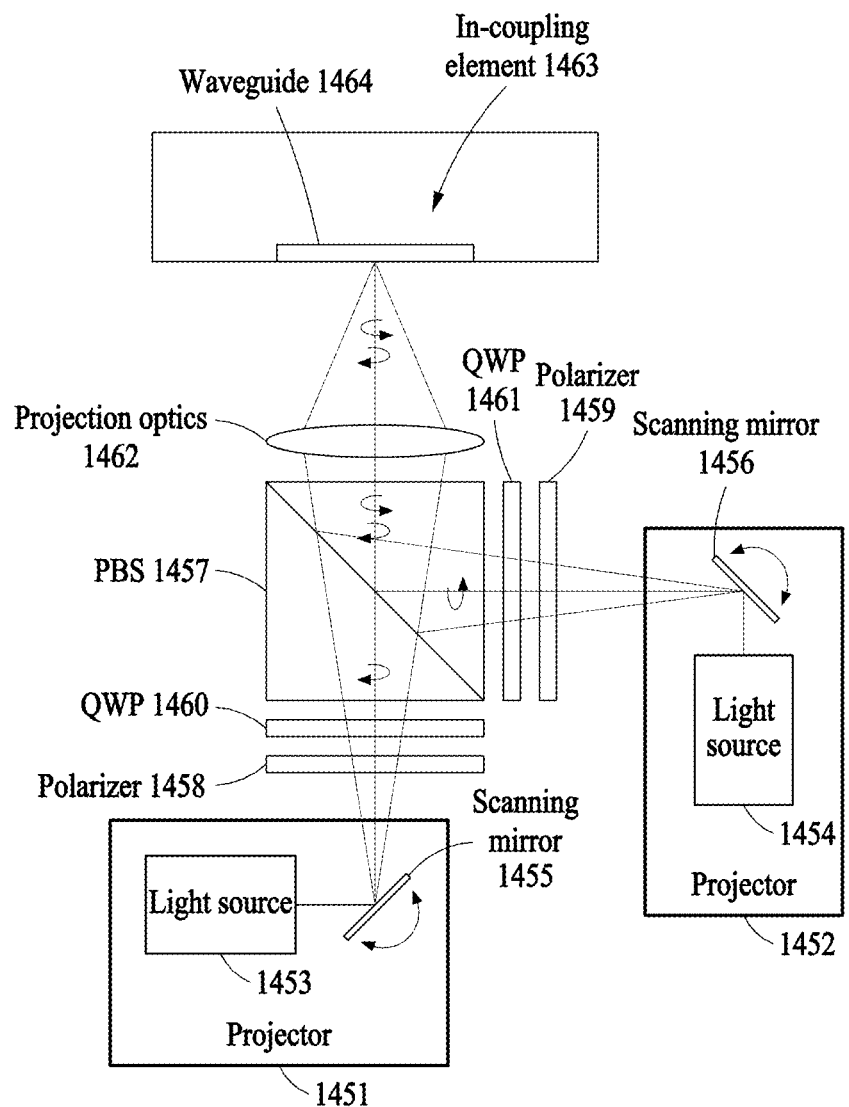

FIGS. 14A and 14B illustrate structures of multi-view PGUs providing various light sources and image sources according to various embodiments.

FIG. 14A shows a multi-view PGU in which one light source 1401 which emits light both with one single wavelength and with different wavelengths is provided. Light may be emitted according to a signal from a control unit depending on a selected operation mode of the AR device (e.g., HUD device). The light may be emitted with different wavelengths simultaneously or in an alternating manner. Then, the light may be transmitted through projection optics 1402 onto a beam splitting cube (e.g., a polarization beam splitter (PBS)) 1403. Light may be redirected to the image sources in the form of a display 1406 and a display 1407, allowing two kinds of images or image patterns (e.g., views $V_1$ and $V_2$) to be generated. The views $V_1$ and $V_2$ may have the FOV of the same size but have distinctions in terms of light wavelengths or polarization states.

FIG. 14A illustrates an example embodiment of including two quarter-wave polarization plates (QWPs) 1404 and 1405, which are arranged in front of reflective displays 1406 and 1407, respectively, to provide an image which is generated in the image sources with a predetermined polarization state (e.g., linear P polarization or S polarization).

The display 1406 and the display 1407 may generate images for the right eye and the left eye, where the images may differ in terms of polarization states as shown in FIG. 14A, or in terms of wavelengths. The displays 1406 and 1407 may correspond to image sources. The resulting two images, one P-polarized and the other one S-polarized, may be converted using projection optics 1408 from spatial images into angular images in the same FOV and provided to a waveguide 1410 through an in-coupling element 1409. If liquid crystal on silicon (LCOS) displays are used as the displays 1406 and 1407, two polarization elements, such as a quarter-wave plate (QWP) and a half-wave plate (HWP), may be used. The QWP may be a quarter-wave plate that converts linear-polarized light into circular-polarized light, and the HWP may rotate the polarization state by 90 degrees.

FIG. 14B shows a multi-view PGU having two or more light sources 1453 and 1454. For example, the light sources 1453 and 1454 may be laser light emitting diodes which emit light with one single wavelength. The light sources 1453 and 1454 may emit single-colored light or multi-colored light. The light sources 1453 and 1454 may also be lamps, light emitting diodes (LEDs), or laser diodes (LDs). Light may be emitted according to a signal from the control unit depending on the selected operation mode of the HUD. Light may be provided to scanning mirrors 1455 and 1456 which function in an alternating manner according to a signal from the control unit, wherein the scanning mirrors 1455 and 1456 may be configured to rotate about two axes of X and Y and generate 2D images for the right eye and the left eye, respectively. Thus, the scanning mirrors 1455 and 1456 may correspond to image sources. The light source 1453 and the scanning mirror 1455 may constitute a projector 1451, and the light source 1454 and the scanning mirror 1456 may constitute a projector 1452. For example, the projectors 1451 and 1452 may correspond to laser beam scanning (LBS) projectors.

In FIG. 14B, polarizers 1458 and 1459 may be polarizing elements that are capable of transmitting light with only one polarization component (linear S, linear P, right-hand circular, or left-hand circular polarization).

QWPs 1460 and 1461 may be quarter-wave plates that convert the linear polarized light into circular polarized light.

Thus, the image source in the form of the scanning mirror 1455 with the light source 1453 may constitute the projector 1451 which generates an image (e.g., image for the right eye), wherein the image may pass through the polarizer 1458 in which it is linearly polarized, then pass through the QWP 1460. The linear-polarized image may be converted into a circular-polarized image (e.g., RHCP image) through the QWP 1460, and provided to a PBS 1457. The image source in the form of the scanning mirror 1456 with the light source 1454 may constitute the projector 1452 which generates an image (e.g., image for the left eye). The image may pass through the polarizer 1459 and the QWP 1461, be converted into a circular-polarized image (e.g., LHCP image), and be provided to the PBS 1457. In the PBS 1457, the RHCP and LHCP images may be combined and transmitted through projection optics 1462 to a waveguide 1464. The two images, one being an RHCP image and the other one being an LHCP image, may be converted from spatial images into angular images in the same FOV through the projection optics 1462 and provided to the waveguide 1464 via an in-coupling element 1463.

Each of the image sources may be one of a self-luminous display using microscopic light emitting diodes (µLEDs) as backlight, a liquid crystal display (LCD), a reflective type liquid crystal display (e.g., LCOS), a digital micromirror device (e.g., DMD), and a scanning mirror based image generation device (e.g., LBS projector).

Figure 15A:
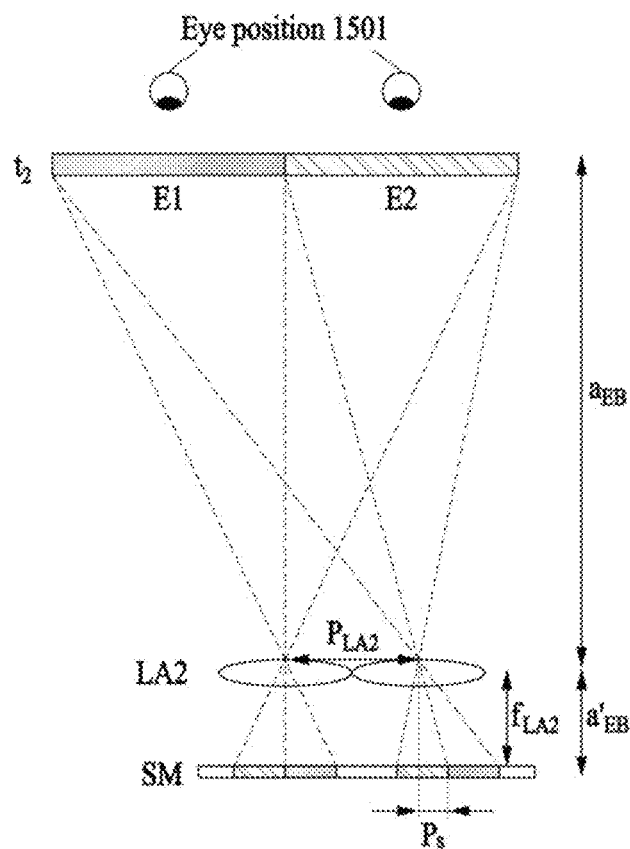
FIGS. 15A and 15B illustrate operations of a spatial mask in an active operation mode according to example embodiments.
Figure 15B:
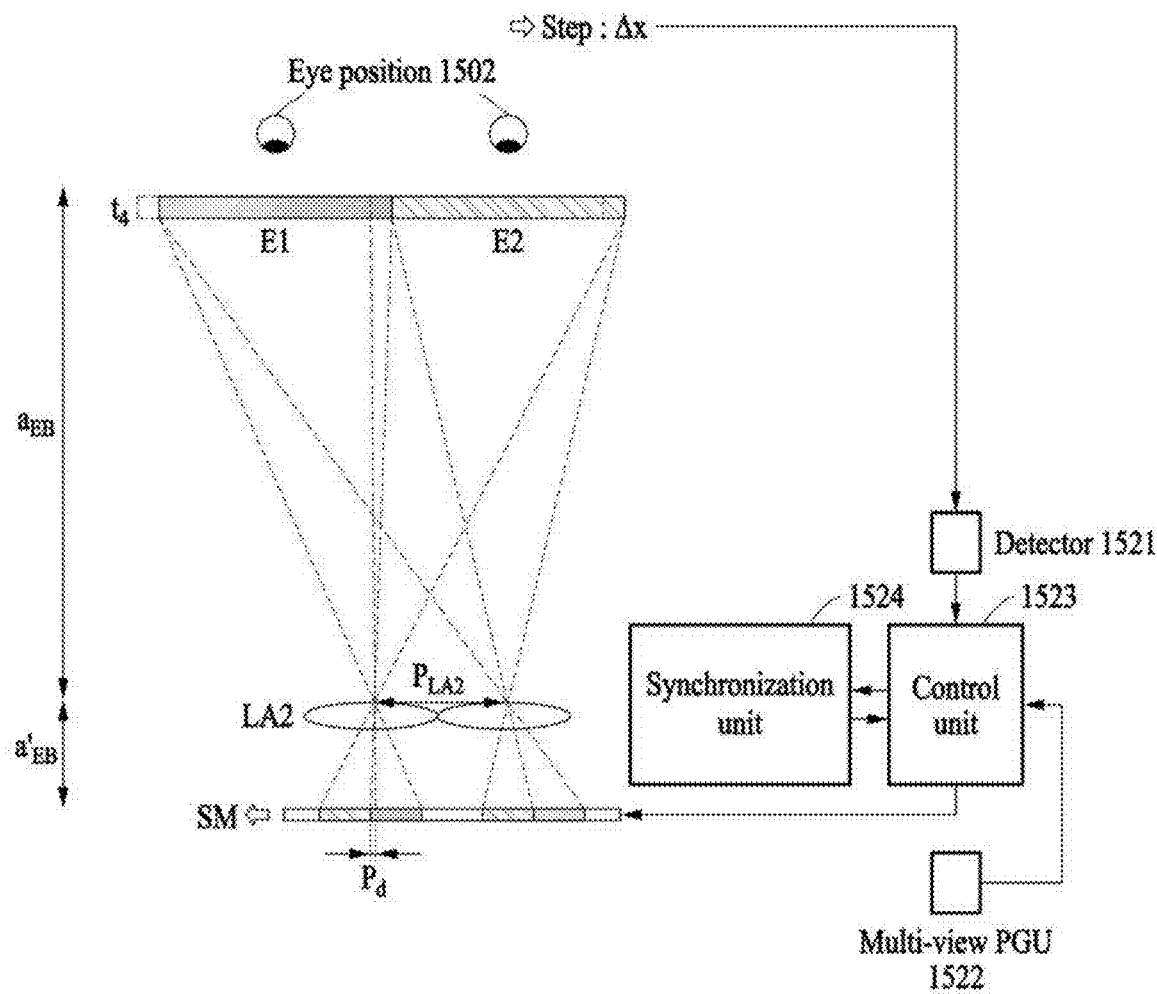

FIGS. 15A and 15B illustrate operations of a spatial mask in an active operation mode according to example embodiments.

FIG. 15A shows a scheme of generating two viewing zones E1 and E2 of two different views in an active operation mode.

FIG. 15B shows a scheme of generating two viewing zones E1 and E2 of two different views in an active operation mode of the spatial mask SM when the position of the eyes of a user (e.g., driver) of an AR device (e.g., HUD device) changes.

In the active operation mode of the spatial mask SM, an image may be displayed in an alternating manner for each eye. In the active operation mode, the operation of an image source (e.g., a display) may be synchronized with the spatial mask SM. This operation mode may be implemented with one image source and one projection optics.

In the active operation mode, a multi-view PGU 1522 may generate a stereo image by generating two images by one image source with one spectral composition and one polarization state. The operation of the spatial mask SM may be regulated so as to display the image for the right eye and for the left eye (the image of E1 and E2) in the eyebox in an alternating manner. Thus, the spatial mask SM may operate in two modes of outputting an image in the area of the left viewing zone (e.g., E1) and in the area of the right viewing zone (e.g., E2). The frequency of pattern change (e.g., operating frequency) for the spatial mask SM may be equal or close to the frame change frequency in the display of the multi-view PGU 1522 when generating the image.

In this case, the spatial mask SM may be a spatial light modulator (e.g., a transparent LCD) to which the mask pattern, which consists of black and white stripes, is output.

The spatial mask SM may transmit light where the stripe is white and may block the light path where the stripe is black. In this case, the spatial mask SM may operate as a filter. Meanwhile, the mask pattern (e.g., width and order of stripes) may be selected such that only an area for one eye (right or left) is illuminated in the exit pupil of the AR device (e.g., HUD device). In this case, only one viewing zone may be generated.

Thus, two mask patterns may be generated in the spatial mask SM to light up the right eye and the left eye. These mask patterns may follow each other in an alternating manner. Thus, one viewing zone or the other viewing zone may be lit up intermittently with a predetermined frequency. At the same time, the multi-view PGU 1522 may intermittently generate images for the right eye and the left eye, with the same frequency with which the spatial mask SM operates. Thus, the user (e.g., the driver of the vehicle) may view different images with the left eye and the right eye. When the eyes of the user move, a transmission filter pattern may be output in the spatial mask SM in the course of time t. In the scheme of FIG. 15A, t2 stands for the time of outputting the filter in the spatial mask SM, wherein the filter may generate the viewing zone E2 for the right eye. Thus, FIG. 15A also shows a state in which the viewing zone E1 is not active (i.e., there is no image), and the viewing zone E2 is active (i.e., there is an image).

For the operation of the spatial mask SM, a static pitch $P_s$ may be calculated. For example, the static pitch may be a spatial pitch of the spatial mask SM which defines the positions of the viewing zones from each lens in the second lens array LA2 and their correct superposition. The static pitch $P_s$ (mm) of the spatial mask SM may be calculated as follows.

$$P_s = M^* P_{LA2} \qquad \text{[Equation 5]}$$

$P_s$ denotes the static pitch, and $P_{LA2}$ denotes the period of the second lens array LA2. $P_s$ and $P_{LA2}$ may be in mm. M denotes the magnification of the second lens array LA2, which may be expressed by Equation 2 described above.

The static pitch $P_s$ may characterize the spatial mask SM, and should be consistent with the period of the second lens array LA2. FIG. 15B shows a scheme of generating two viewing zones E1 and E2 in the active operation mode of the spatial mask SM, when the eyes of the user move by Δx from a position 1501 to a position 1502 at time t4, which is the time of outputting the filter in the spatial mask SM, which generates the viewing zone E2 for the right eye.

According to FIG. 15B, when the position x of the eyes of the user or the driver of the vehicle changes, a detector 1521 may detect the movement of the eyes and output a signal indicating an amount of Δx, and a control unit 1523 may transmit a signal indicating an amount of shift of the image to the spatial mask SM. For example, the amount of shift may be specified by the number of pixels, and a dynamic pitch $P_d$ that characterizes the spatial pitch of the mask shift in pixels may be used to specify the number of pixels. Further, a synchronization unit 1524 may synchronize the operating frequency of the spatial mask SM with the frame change frequency in the image source of the multi-view PGU when the image is generated.

The dynamic pitch $P_d$ may be defined as follows.

$$P_d = M * \Delta x \quad \text{[Equation 6]}$$

M denotes the magnification of the second lens array LA2, and $\Delta x$ denotes the amount of movement of the eyes of the user (e.g., driver) from the reference position. $P_d$ and $\Delta x$ may be in mm. Pa may be a value substantially the same as $\Delta x_{SM}$ described with reference to FIG. 13B.

The active operation mode of the spatial mask and the multi-view PGU has been described in detail with reference to FIGS. 15A and 15B.

Figure 16A:
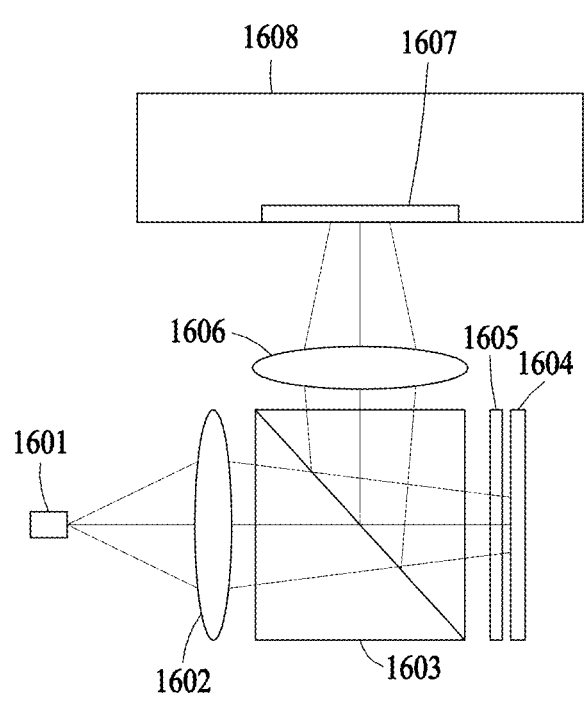
FIGS. 16A to 16C illustrate operations of a multi-view PGU in an active operation mode according to example embodiments.
Figure 16B:
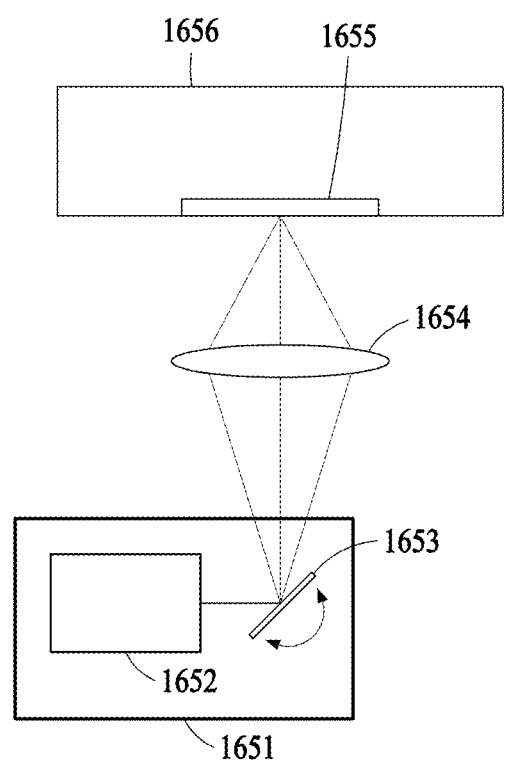
Figure 16C:
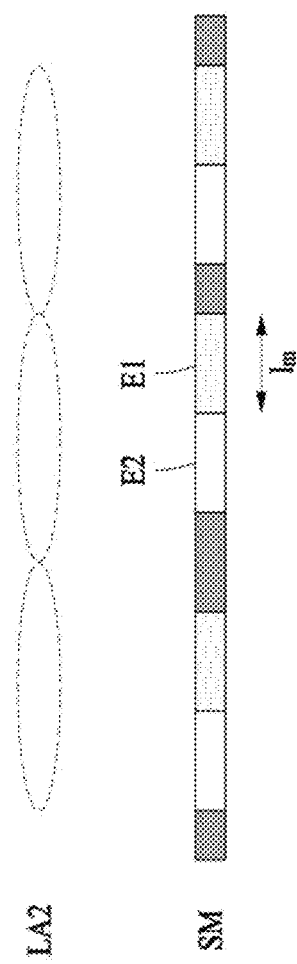

FIGS. 16A to 16C illustrate operations of a multi-view PGU in an active operation mode according to example embodiments.

FIG. 16A shows a multi-view PGU providing one light source 1601 which emits light with one spectral composition or one polarization state. The light may be transmitted through projection optics 1602 onto a beam splitting cube (e.g., PBS) 1603. In the PBS, the light may be redirected to the image source in the form of a display 1604. The image source of the display 1604 may be configured to generate two images, for the left eye and the right eye, in an alternating manner. Then, the resulting images may be transmitted to projection optics 1606 through a QWP 1605, and the projection optics 1606 may convert spatial images corresponding to the resulting images into angular images in the same FOV. The angular images may be provided to a waveguide 1608 via an in-coupling element 1607.

This structure may be quite inexpensive and easy to implement. However, the active operation mode may require synchronization of operation of the spatial mask SM and the image source.

Each of the image sources may be one of a self-luminous display using microscopic light emitting diodes (μLEDs) as backlight, a liquid crystal display (LCD), a reflective type liquid crystal display (e.g., LCOS), a digital micromirror device (e.g., DMD), and a scanning mirror based image generation device (e.g., LBS projector).

FIG. 16B shows a multi-view PGU with an image unit, which is based on a scanning mirror 1653, in an active operation mode.

The multi-view PGU of FIG. 16B may use the technique of LBS including the scanning mirror 1653. A light source 1652 in the form of R, G, and B lasers may emit light with respective wavelengths, which may be directed to the scanning mirror 1653 in an alternating manner. The scanning mirror 1653 may be configured to rotate about two axes of X and Y and generate a 2D image for the right eye and the left eye, respectively. Thus, the scanning mirror 1653 may correspond to an image source. The light source 1652 and the scanning mirror 1653 may constitute a projector 1651, such as an LBS projector. The projector 1651 may generate an image for one eye at respective times $t_1, t_3, t_5, \ldots, t_{2k-1}$, and generate an image for the other eye at respective times $t_2, t_4, t_6, \ldots, t_{2k}$.

Then, the resulting images may be converted by projection optics 1654 from spatial images into angular images in the same FOV and provided to a waveguide 1656 via an in-coupling element 1655.

As described above, the requirement for the active operation mode may be that the operating frequency (frame change) of the spatial mask SM should be equal to the frame change frequency in the image source (in this case, projector). This requirement may be met by means of including a synchronizing unit in the circuit, which adjusts the operation of the spatial mask and the image source based on a signal from the control unit as shown in FIG. 15B.

FIG. 16C shows a structure of a spatial mask SM in an active operation mode. The spatial mask SM may be a spatial light modulator (e.g., LC panel), to which a mask pattern that transmits or blocks light is output. The mask pattern may include black and white stripes.

In the place where the stripe is white, a unit mask filter E2 may transmit the light, and in the place where the stripe is black, a unit mask filter E1 may block the light. In this case, the spatial mask SM with the unit mask filters E1 and E2 may operate as a filter.

Meanwhile, for the unit mask filter E2, the transmitting state may correspond to the times $t_2, t_4, t_6, \ldots, t_{2k}$, and the absorbing state (blocking the light) may correspond to the times $t_1, t_3, t_5, \ldots, t_{2k-1}$.

For the unit mask filter E1, the transmitting state may correspond to the times $t_1, t_3, t_5, \ldots, t_{2k-1}$, and the absorbing state (blocking the light) may correspond to the times $t_2, t_4, t_6, \ldots, t_{2k}$.

The bandwidth for the spatial mask SM to generate one view, i.e., the unit filter dimension $I_m$ for the mask may be defined as follows.

$$l_m = n * P \quad \text{[Equation 7]}$$

n denotes the number of pixels for each view in a unit band. P denotes a pixel pitch defined based on mask parameters, such as the static pitch $P_s$ and the dynamic pitch $P_d$. The static pitch $P_s$ and the dynamic pitch $P_d$ have been described with reference to FIGS. 15A and 15B. $1m$ and P may be in mm. The mask pattern (width and order of stripes) may be selected such that only an area for one eye (right or left eye) is illuminated in the exit pupil of the AR device (e.g., HUD device), i.e., one viewing zone is generated.

Two mask patterns may be generated in the spatial mask for lighting up the right eye and the left eye. These mask patterns may be changed in an alternating manner. Thus, one viewing zone may be lit up after the other viewing zone in an alternating manner with a predetermined frequency. At the same time, a multi-view PGU may intermittently generate the pictures for the right eye and the left eye, at the same frequency with which the spatial mask operates.

The AR device (e.g., HUD device) with exit pupil replication according to example embodiments may provide a 3D AR image. The multi-view PGU in the AR device (e.g., HUD device) may generate a multi-view picture including several images generated from a plurality of views from different viewing angles. The waveguide may provide for device compactness and volume of less than 5 liters and provide for pupil replication, thus generating a wide exit pupil. The eyebox viewing zone generation unit may translate the spatial mask pattern in the form of a filter onto the plane of the exit pupil, thus generating viewing zones and providing a 3D image.

Figure 17A:
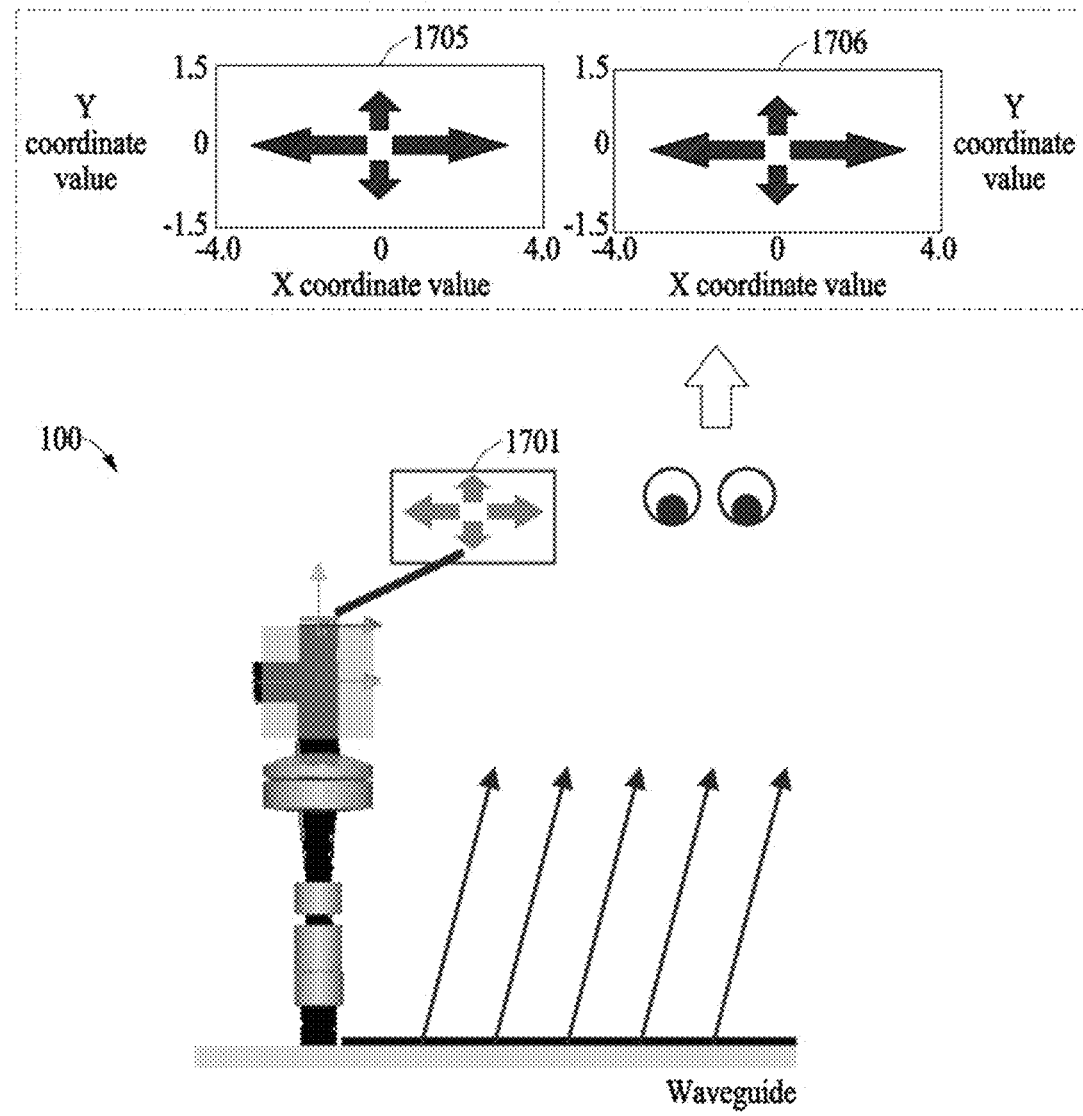
FIGS. 17A to 17C illustrate operations of providing images in eyeboxes of various image generation systems.
Figure 17B:
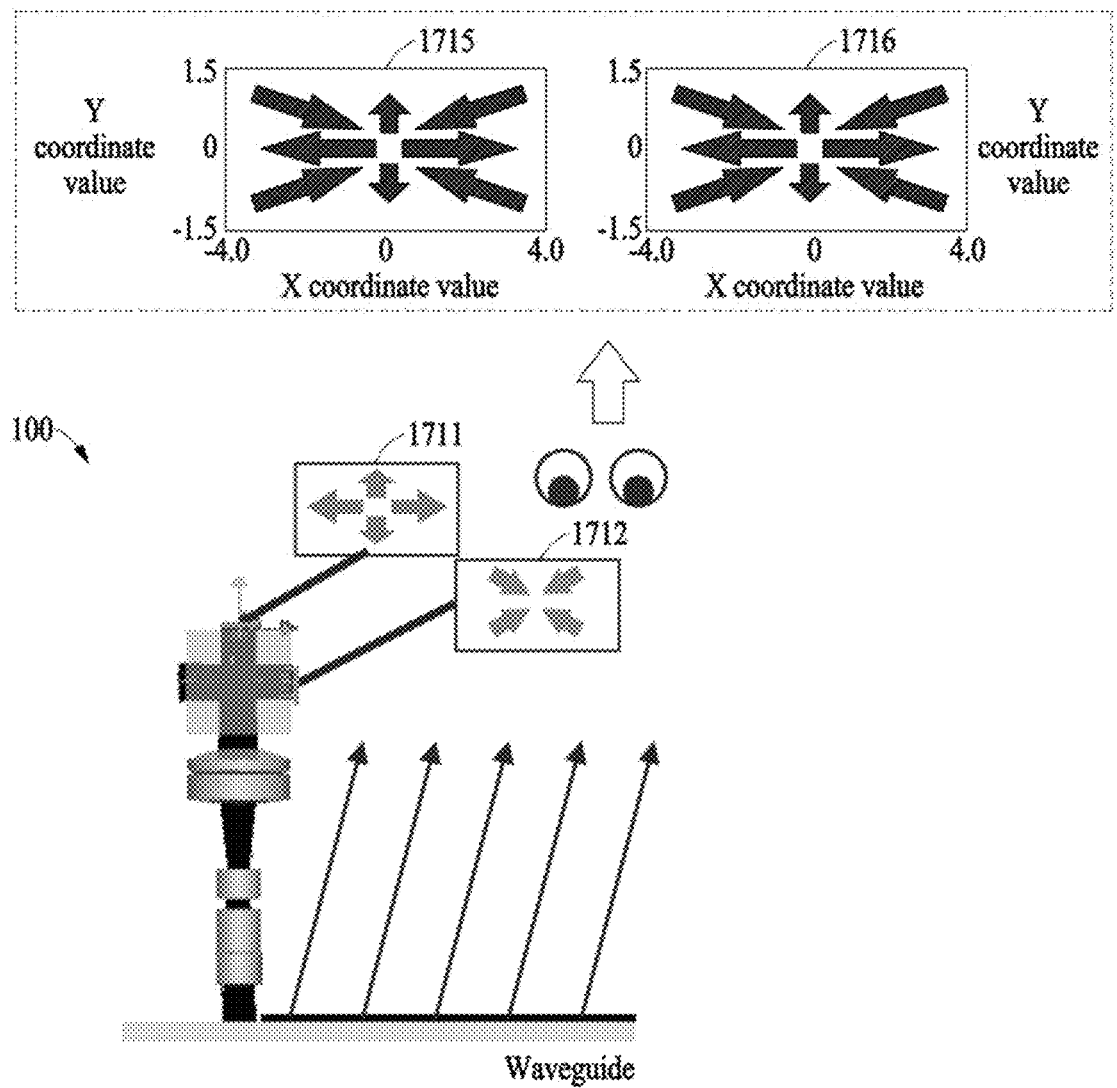
Figure 17C:
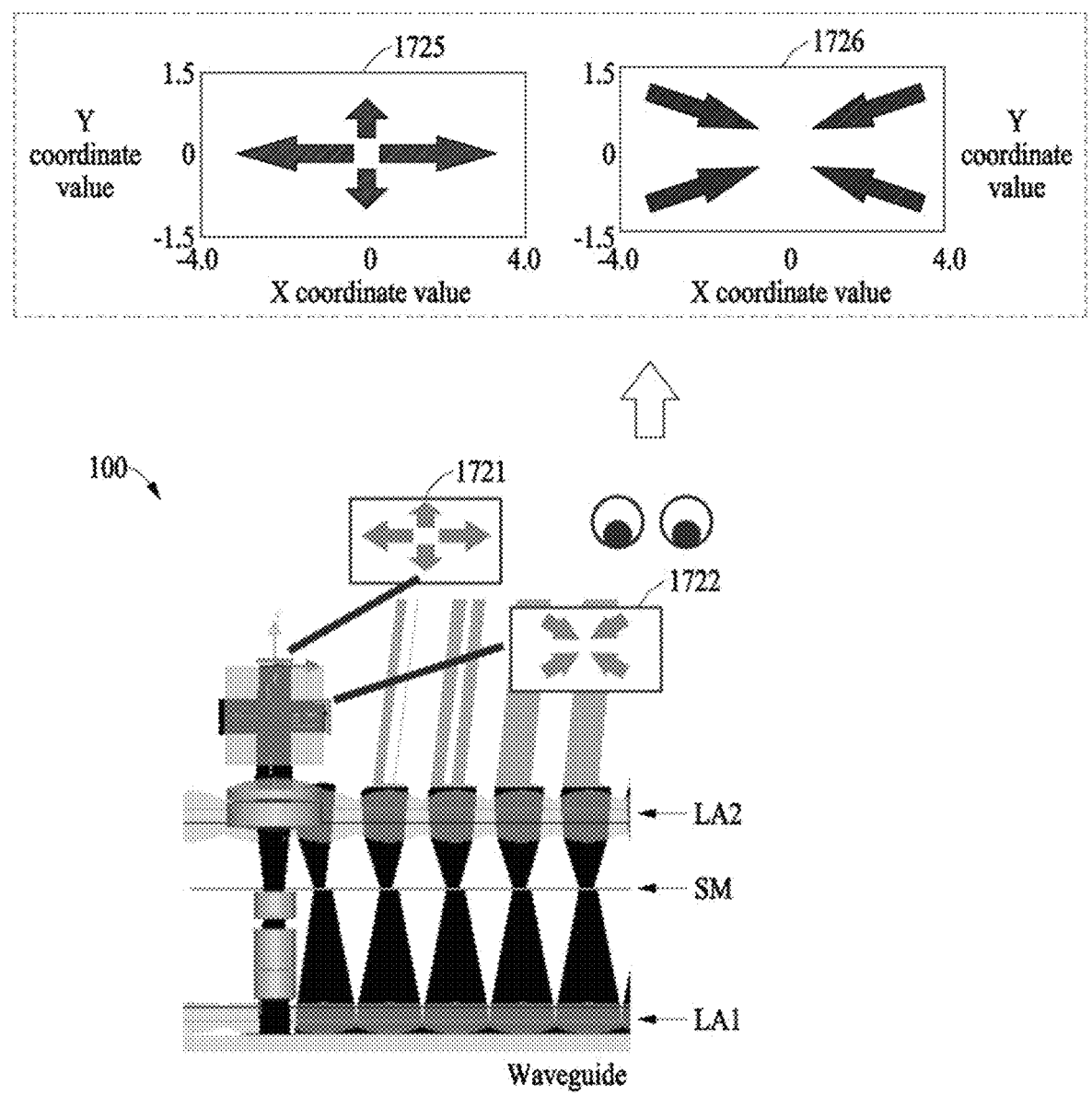

FIGS. 17A to 17C illustrate operations of providing images in eyeboxes of various image generation systems.

FIG. 17A shows a structure of a waveguide-based image generation system with one display 1701 and one light wavelength. Here, the generated image may be output in an eyebox through projection optics and a waveguide. In this case, the same pictures 1705 and 1706 may be provided to both eyes.

FIG. 17B shows a structure of an image generation system with two displays 1711 and 1712 with different wavelengths. Here, the two generated images may be provided to a waveguide through projection optics and provided superimposed in an eyebox after out-coupling from the waveguide. In this case, both eyes may view the same pictures 1715 and 1716 that are superimposed.

FIG. 17C shows a structure of an AR device (e.g., HUD device) with exit pupil replication according to example embodiments, where for each eye, a separate image is generated, and a multi-view PGU is provided. The multi-view PGU may include two displays 1721 and 1722 which operate with different wavelengths (here, the number of displays may vary), a waveguide that provides for pupil replication, and an eyebox viewing zone generation unit including at least two lens arrays LA1 and LA2 (the number of lens arrays may vary) and a spatial mask SM. The spatial mask SM may translate the spatial mask pattern in the form of a filter into the exit pupil plane, whereby a separate image for each eye may be generated on the exit pupil plane. As a result, images 1725 and 1726 for the right eye and the left eye may form a stereopair, and a 3D image may be viewed.

Figure 18:
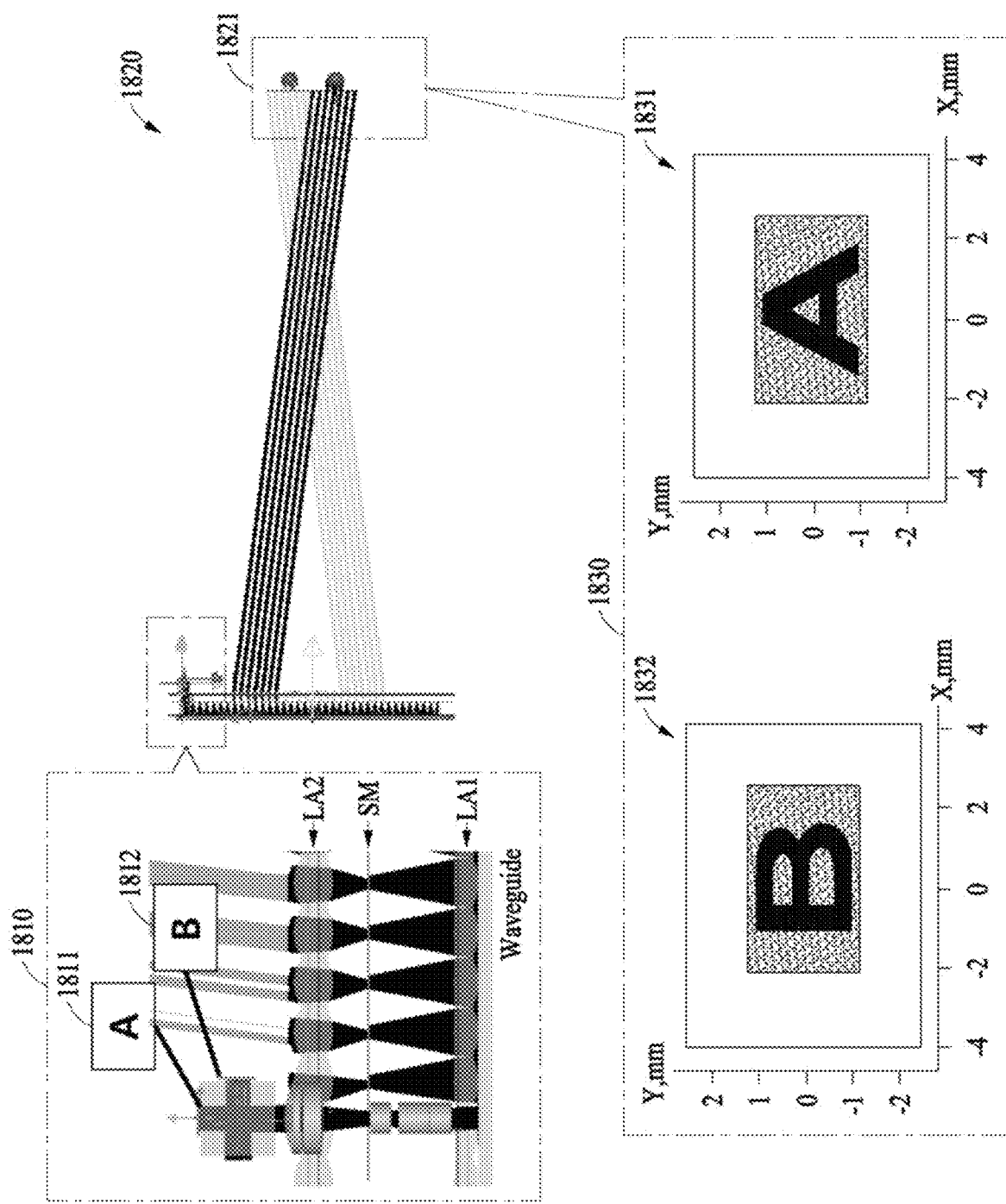
FIG. 18 illustrates a process of displaying images "A" and "B" according to example embodiments.

FIG. 18 illustrates a process of displaying images "A" and "B" according to example embodiments.

An area 1810 shows a structure of an AR device (e.g., HUD device) according to example embodiments, which provides images "A" and "B" using two displays.

For example, image translation may be modeled, where displays 1801 and 1802 operate with similar wavelengths: λ=519 nm, and λ=520 nm, respectively. The spatial mask SM may include narrow-band dichroic filters which enable image transmission. According to the present example, filters with wavelengths λ=519 nm and λ=520 nm may be used. In this case, a user may view different green-colored pictures "A" and "B" for each position of the left eye and the right eye. If the images for the right eye and the left eye constitute a stereopair, a 3D image may be generated.

An area 1820 shows beam shaping according to the AR device (e.g., HUD device) of the area 1810, and the propagation of beams which characterize the images in an eyebox 1821 for the left eye and the right eye with λ=519 nm and λ=520 nm.

An area 1830 shows an image 1831 generated in the retina of the right eye and an image 1832 generated in the retina of the left eye in the eyebox 1821. The images 1831 and 1832 may not substantially differ in color. In other words, it may be difficult for the eyes to register a wavelength difference of about 1 nm.

The HUD device with exit pupil replication, configured to generate a 3D image, may provide a compact solution with a volume of less than 5 liters and thus, may be integrated into any vehicle instrument panels or substitute for the panels.

Further, the HUD device may ensure high concentration and safety of the driver by generating a stereo image and a virtual image in infinity. For example, the HUD device may generate a stereo image that corresponds to the real-world traffic situation, so as to enable the driver to concentrate on the road or on the surroundings including navigation information, at the same time being provided with information on the speed, engine status, telephone calls. Further, the driver may be provided with other external information which would otherwise distract the attention due to the use of other external devices.

The AR device (e.g., HUD device) may use a waveguide in combination with an eyebox viewing zone generation unit including lens arrays and a respective spatial mask, thus allowing generating a stereo image in the eyebox. Such configuration may significantly reduce the volume of the device as compared to similar solutions in the existing autostereoscopic displays.

The HUD device may be quite inexpensive in mass production and conveniently integrated in any automotive vehicle type.

The AR device may also be used in any compact portable devices, such as tablets or laptops, as well as in teleconference systems.

Figure 19A:
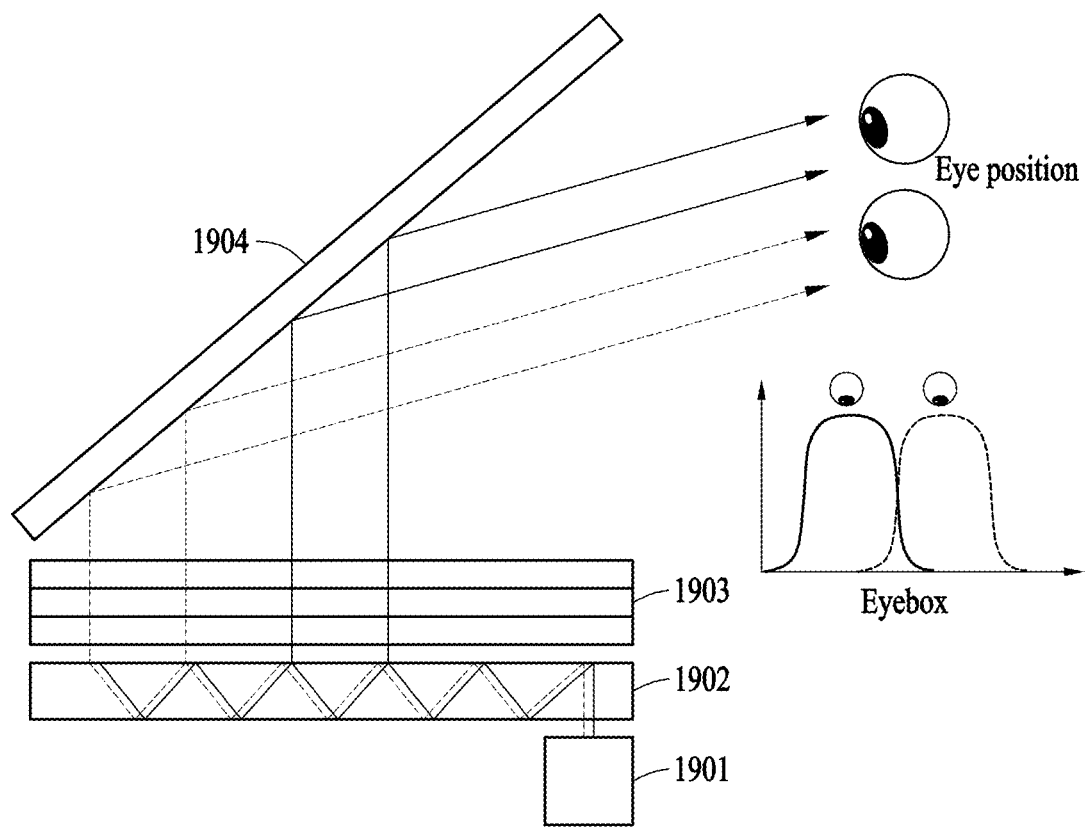
FIGS. 19A and 19B illustrate structures of compact foldable beam combiners according to example embodiments.
Figure 19B:
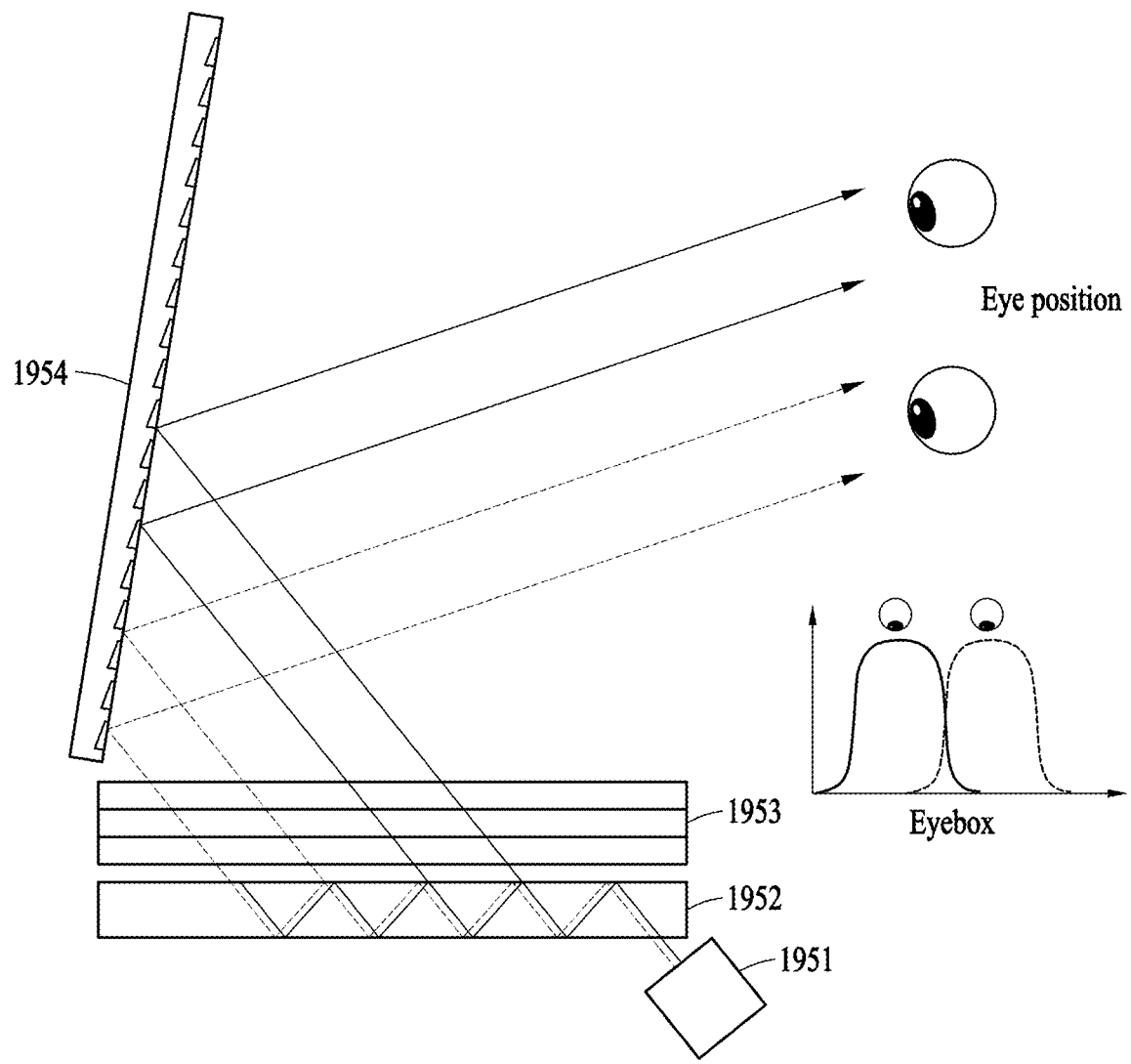

FIGS. 19A and 19B illustrate structures of compact foldable beam combiners according to example embodiments.

FIG. 19A shows a structure of an electronic device that uses a beam combiner 1904.

As shown in FIG. 19A, the electronic device may include a multi-view PGU 1901, a waveguide 1902, an eyebox viewing zone generation unit 1903, and a beam combiner 1904. The multi-view PGU 1901, the waveguide 1902, the eyebox viewing zone generation unit 1903, and the beam combiner 1904 may perform substantially the same operations as corresponding components included in the HUD device 100. Additionally, the beam combiner 1904 may be foldable to change the direction of an incident light, and/or may be configured to move closer to or farther away from the eyebox viewing zone generation unit 1903 to change the direction of an incident light. For example, between two opposing ends of the beam comber 1904, a first end may be placed at a fixed position, and a second end may move up or down to become closer to or farther away from the eyebox viewing zone generation unit 1093. The beam combiner 1904 may be a glass plate with a coating capable of reflecting or redirecting the incident light to the eyebox. A reflective coating may be applied to the beam combiner 1904. The beam combiner 1904 may define an angle of beam reflection towards the eyebox. The beam combiner 1904 may include or interoperate with an actuator to change a position of the beam combiner 1904 in relation to the eyebox viewing zone generation unit 1903.

FIG. 19B shows a structure of an electronic device where a beam combiner 1954 with a beam redirection function is used.

As shown in FIG. 19B, the electronic device may include a multi-view PGU 1951, a waveguide 1952, an eyebox viewing zone generation unit 1953, and the beam combiner 1954. The multi-view PGU 1951, the waveguide 1952, and the eyebox viewing zone generation unit 1952, and the beam combiner 1954 may perform substantially the same operations as corresponding components included in the HUD device 100. The beam combiner 1954 may be a glass plate with a coating capable of reflecting or redirecting the image to the eyebox. For this purpose, diffraction patterns and/or prismatic patterns may be applied to the beam combiner 1954. For example, a tilt angle of the beam combiner 1954 may be fixed, and the multi-view PGU 1951 may move to change a light emitting direction of the multi-view PGU 1951 and thereby to adjust an angle of the light beam that is reflected or redirected to the eyebox. For example, the multi-view PGU 1951 may be rotatable to change the light emitting direction. In another example, both the beam combiner 1954 and the multi-view PGU 1951 may be movable to change the angle of the light beam reflected or redirected to the eyebox. The multi-view PGU 1951 and/or the beam combiner 1954 may include or interoperate with an actuator to change the position of the multi-view PGU 1951 and/or the beam combiner 1954.

Figure 20:
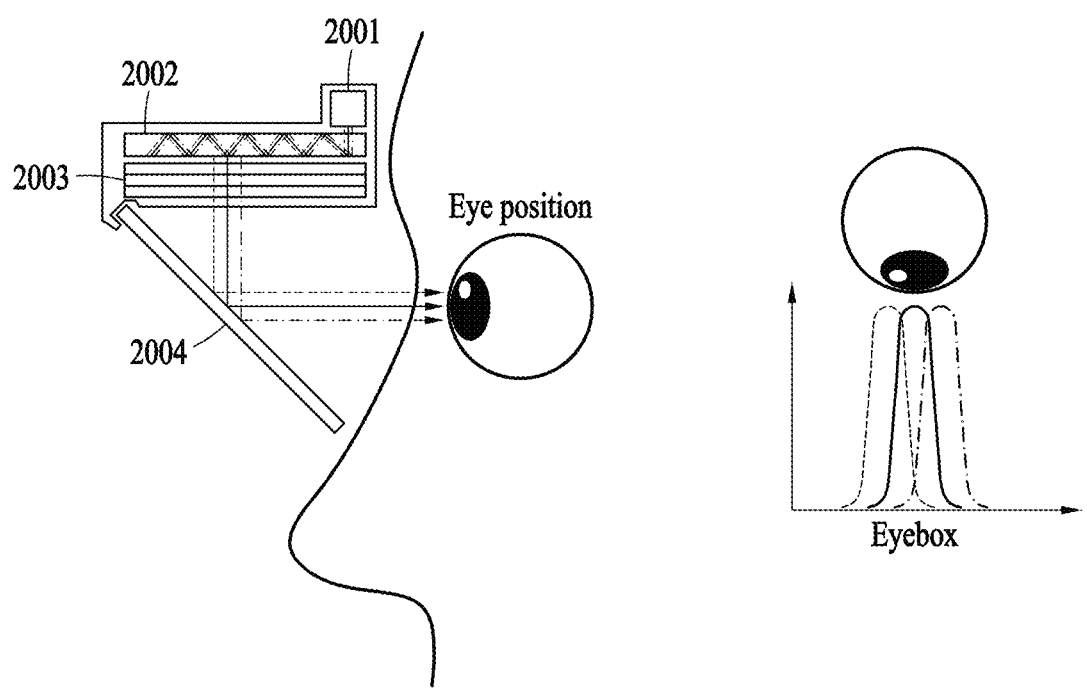
FIG. 20 illustrates a structure of eyewear-type augmented reality (AR) glasses according to example embodiments.

FIG. 20 illustrates a structure of eyewear-type AR glasses according to example embodiments.

An AR device according to example embodiments may be also used in AR glasses, the scheme of which is shown in FIG. 20. The AR glasses may include a multi-view PGU 2001, a waveguide 2002, an eyebox viewing zone generation unit 2003, and a beam combiner 2004, and may be the same as or similar to the AR device (e.g., HUD device) of the other example embodiments with this configuration. In the present example, a multi-view picture may be generated, which allows displaying 3D images.

The beam propagation directions in FIGS. 19A, 19B, and 20 are illustrated using solid and dashed lines. The line may characterize the different properties of the beams, which differ in terms of their composition by wavelength or polarization state, or are temporally separated. The curves in the graphs shown beside the structures of the devices in FIGS. 19A, 19B, and 20 illustrate the intensities of illumination of the viewing zones for each beam which has a different composition.

The units described herein may be implemented using a hardware component, a software component and/or a combination thereof. A processing device may be implemented using one or more general-purpose or special-purpose computers, such as, for example, a processor, a controller and an arithmetic logic unit (ALU), a DSP, a microcomputer, an FPGA, a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciate that a processing device may include multiple processing elements and multiple types of processing elements. For example, the processing device may include a plurality of processors, or a single processor and a single controller. In addition, different processing configurations are possible, such as parallel processors.

The software may include a computer program, a piece of code, an instruction, or some combination thereof, to independently or uniformly instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network-coupled computer systems so that the software is stored and executed in a distributed fashion. The software and data may be stored by one or more non-transitory computer-readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher-level code that may be executed by the computer using an interpreter.

The foregoing exemplary embodiments are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. An augmented reality device, comprising:
   a multi-view picture generation unit configured to generate a multi-view picture comprising single-view images having respective individual optical characteristics, and generate an exit pupil comprising the generated multi-view picture;
   a waveguide configured to replicate the exit pupil generated by the multi-view picture generation unit; and
   an eyebox viewing zone generation unit that comprises a spatial mask configured to perform light filtering based on the individual optical characteristics, and that is configured to separate the single-view images based on the individual characteristics, and generate a three-dimensional (3D) image by outputting the single-view images in viewing zones in an eyebox corresponding to views of the single-view images.

2. The augmented reality device of claim 1, wherein the single-view images have a same field of view (FOV).

3. The augmented reality device of claim 1, wherein the multi-view picture generation unit comprises at least one light source, a beam combiner, at least one image source, and projection optics.

4. The augmented reality device of claim 1, wherein
   the multi-view picture generation unit comprises at least two light sources, each configured to emit light with one wavelength or with different wavelengths, and
   the at least two light sources are configured to emit light simultaneously or in an alternating manner according to a control signal.

5. The augmented reality device of claim 3, wherein the beam combiner is configured to mix and combine light from different light sources and output the mixed light to the image source.

6. The augmented reality device of claim 5, wherein the beam combiner is an optical element with a reflective coating that allows the light to be reflected or redirected in a predetermined direction.

7. The augmented reality device of claim 6, wherein the optical element is a glass plate with a dichroic coating or with a coating having prismatic or diffraction patterns.

8. The augmented reality device of claim 5, wherein the beam combiner is a waveguide-based combiner.

9. The augmented reality device of claim 1, wherein the waveguide is configured to perform X-axial replication and Y-axial replication at different times or simultaneously, in replicating the exit pupil.

10. The augmented reality device of claim 1, wherein the waveguide corresponds to a flat substrate with an in-coupling element, an expander, and an out-coupling element embedded therein.

11. The augmented reality device of claim 10, wherein
    the in-coupling element is configured to in-couple light into the waveguide with a first predetermined angle,
    the expander is configured to replicate the exit pupil within the waveguide, and the out-coupling element is configured to out-couple the light from the waveguide with a second predetermined angle.

12. The augmented reality device of claim 10, wherein the waveguide is further configured to perform simultaneous exit pupil replication along X and Y axes, and
the expander, the in-coupling element, and the out-coupling element are combined in one optical element in a form of a diffraction element.

13. The augmented reality device of claim 1, wherein the multi-view picture generation unit is further configured to generate RGB images, and the waveguide comprises a combination of three waveguides, each of which translates an image of one color of the RGB images.

14. The augmented reality device of claim 1, wherein the multi-view picture generation unit is further configured to generate RGB images, and
the waveguide comprises a combination of a first waveguide configured to translate an image of at least one color of the RGB image, and a second waveguide configured to an image of at least two colors of the RGB images.

15. The augmented reality device of claim 1, wherein the multi-view picture generation unit is further configured to generate RGB images, and the waveguide comprises a single waveguide configured to translate a combined image of the RGB images.

16. The augmented reality device of claim 1, wherein the eyebox viewing zone generation unit comprises a stack of at least two optical arrays.

17. The augmented reality device of claim 16, wherein the spatial mask is configured to perform the light filtering based on at least one of a wavelength and a polarization state of the individual characteristics in a passive operation mode.

18. The augmented reality device of claim 16, wherein the spatial mask is configured to perform the light filtering by adjusting an image generation time of the individual characteristics in an active operation mode.

19. The augmented reality device of claim 16, wherein the stack of at least two optical arrays is configured to provide a telescopic beam path to an input and an output of the stack.

20. The augmented reality device of claim 16, wherein the stack of the at least two optical arrays comprises microlens arrays, and each of the microlens arrays comprises at least one lenticular lens, which is a cylindrical lens or a spherical lens.

21. The augmented reality device of claim 20, wherein the microlens arrays comprise a first microlens array and a second microlens array, and a number of lenses in the first microlens array is equal to a number of lenses in the second microlens array.

22. The augmented reality device of claim 16, wherein
a first array of the stack is a micromirror array comprising at least one mirror,
a second array of the stack is at least one cylindrical or spherical lens array, and
a number of mirrors in the first array corresponds to a number of lenses in the second array.

23. The augmented reality device of claim 16, wherein a first microlens array of the stack is included in an out-coupling element of the waveguide, and is configured to out-couple light and focus the light on the spatial mask.

24. The augmented reality device of claim 16, wherein in a passive operation mode, the spatial mask is a layer of absorbing material with intermittent filter segments embedded therein, each of which transmits light of a predetermined wavelength which corresponds to a wavelength of light emitted from at least one light source of the multi-view picture generation unit.

25. The augmented reality device of claim 24, wherein the filter segments are dichroic filters.

26. The augmented reality device of claim 16, wherein in a passive operation mode, the spatial mask is configured to transmit light based on a polarization state, which is one of S polarization, P polarization, right-hand circular polarization (RHCP), and left-hand circular polarization (LHCP).

27. The augmented reality device of claim 16, wherein in an active operation mode, the spatial mask is configured to display an image with one spectral composition or polarization state in an alternating manner for a left eye and a right eye.

28. The augmented reality device of claim 16, wherein in an active operation mode, an operating frequency of the spatial mask is synchronized to a frame change frequency of an image source of the multi-view picture generating unit.

29. The augmented reality device of claim 16, further comprising:
a detector configured to sense an eye movement; and
an actuator configured to shift the spatial mask in a passive operation mode.

30. The augmented reality device of claim 16, further comprising:
a detector configured to sense an eye movement; and
a controller configured to transmit an amount of image shift to the spatial mask in an active operation mode.

31. The augmented reality device of claim 30, wherein in the active operation mode, the spatial mask is shifted based on the amount of image shift in real time according to the following equation, $$P_d = M * \Delta x,$$

where $P_d$ is a dynamic pitch indicating the amount of shift, M is a magnification of a lens array of the stack, and $\Delta x$ is an amount of the eye movement from a reference position.

32. An image generation method, comprising:
generating a multi-view picture comprising single-view images having respective individual optical characteristics;
generating an exit pupil comprising the generated multi-view picture;
replicating the exit pupil using a waveguide;
separating the single-view images based on the individual optical characteristics via a spatial mask configured to perform light filtering based on the individual optical characteristics; and
generating a three-dimensional (3D) image by outputting the single-view images in viewing zones in an eyebox corresponding to views of the single-view images.

* * * * *